(12) United States Patent
Otsuji et al.

(10) Patent No.: US 7,998,944 B2
(45) Date of Patent: *Aug. 16, 2011

(54) POLYMERIZABLE COMPOUND AND USE THEREOF

(75) Inventors: Atsuo Otsuji, Chiba (JP); Hiroshi Naruse, Ichihara (JP); Mitsuo Nakamura, Chosei-gun (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/732,728

(22) Filed: Mar. 26, 2010

(65) Prior Publication Data

US 2010/0179333 A1    Jul. 15, 2010

Related U.S. Application Data

(63) Continuation of application No. 10/594,497, filed as application No. PCT/JP2005/006399 on Mar. 31, 2005, now Pat. No. 7,723,318.

(30) Foreign Application Priority Data

Mar. 31, 2004 (JP) .................................. 2004-106189
Aug. 20, 2004 (JP) .................................. 2004-240592

(51) Int. Cl.
*A61K 31/695* (2006.01)
*C07D 331/04* (2006.01)

(52) U.S. Cl. ............................................. 514/63; 549/5
(58) Field of Classification Search .................... 514/63; 549/5

See application file for complete search history.

(56) References Cited

U.S. PATENT DOCUMENTS

| 3,903,112 A | 9/1975 | Throckmorton et al. |
| 6,641,805 B1 | 11/2003 | Morita et al. |

FOREIGN PATENT DOCUMENTS

| CN | 87108126 A | 9/1988 |
| EP | 0271839 A2 | 6/1988 |
| GB | 1016529 | 1/1966 |
| JP | 09-110979 | 4/1997 |
| JP | 09-302242 | 11/1997 |
| JP | 10-176081 | 6/1998 |
| JP | 11-140046 | 5/1999 |
| JP | 11-269231 | 10/1999 |
| JP | 11-322930 | 11/1999 |
| JP | 2001-296402 | 10/2001 |
| JP | 2003-261683 | 9/2003 |
| JP | 2003-327583 | 11/2003 |
| KR | 2001-0100851 A | 11/2001 |

OTHER PUBLICATIONS

Jun'Ichi Uenishi et al., "Asymmetric Synthesis of Thietanose", Heterocycles, vol. 47, No. 1, Jan. 1, 1998, pp. 439-451.
Gerald Pattenden et al., "Natural 1,2-Dithiolane 1-Oxides. A Synthetic Approach Based on [2+2]- Cycloaddition Reactions with Thiones", Synlett, Sep. 1991, pp. 717-718.
Donald C. Dittmer et al., "Carbon-13 Chemical Shifts of 3-Substituted Thietanes, Thietane 1-Oxides and Thietane 1,1-Dioxides", Organic Magnetic Resonance, vol. 18, No. 2, Feb. 1982, pp. 82-86.
STN Database, Donald C. Dittmer et al., "Carbon-13 Chemical Shifts of 3-Substituted Thietanes, Thietane 1-Oxides and Thietane 1,1-Dioxides", Organic Magnetic Resonance, vol. 18, No. 2, Feb. 1982, pp. 82-86, Answer 1 of 1 CA Copyright 2009 ACS on STN.
English-language translation of Japanese Patent Publication No. 11-269231.

*Primary Examiner* — Taofiq A Solola
(74) *Attorney, Agent, or Firm* — Buchanan Ingersoll & Rooney PC

(57) ABSTRACT

The present invention is to provide a polymerizable compound which can be a raw material for a resin having high transparency, good heat resistance and mechanical strength required for optical components such as plastic lenses and the like, while attaining a high refractive index (nd) exceeding 1.7, and an optical component composed of such a resin.
Disclosed is a compound represented by the general formula (3),

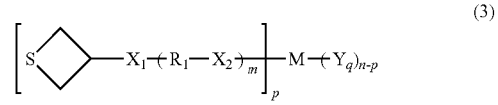

(3)

wherein, in the formula, M represents a metal atom; $X_1$ and $X_2$ each independently represent a sulfur atom or an oxygen atom; $R_1$ represents a divalent organic group; m represents an integer of 0 or 1 or more; p represents an integer of from 1 to n; q represents an integer of from 1 to (n−p); n represents a valence of a metal atom M; Yq each independently represent an inorganic or organic residue; and when q is 2 or more, Yq may be bonded to one another for forming a ring structure with the intermediary of a metal atom M.

6 Claims, No Drawings

POLYMERIZABLE COMPOUND AND USE THEREOF

This application is a Continuation Application of U.S. patent application Ser. No. 10/594,497 filed on Sep. 28, 2006, which is a National Stage Application of PCT/JP2005/06399, filed on Mar. 31, 2005, the entire contents of which is incorporated by reference herein, and claims priority to Japanese Patent Application Nos. 2004-106189, filed on Mar. 31, 2004, and 2004-240592, filed on Aug. 20, 2004, the entire contents of each is incorporated by reference herein.

TECHNICAL FIELD

The present invention relates to a polymerizable compound comprising a thietane group and a metal atom in a molecule, while attaining a very high refractive index, which is useful as a raw material monomer for a transparent resin. Furthermore, the invention relates to a polymerizable composition comprising the compound, a resin obtained by polymerization of the polymerizable composition and an optical component composed of the resin.

BACKGROUND ART

Since an inorganic glass has excellent general properties such as excellent transparency and low optical anisotropy, the inorganic glass has been widely used in many fields as a transparent material. However, the inorganic glass has drawbacks such that it is heavy and easily broken, and has bad productivity when producing a product by molding and processing. As a result, a transparent organic polymer material (optical resin) has been used as a material in place of the inorganic glass. As the optical component obtained from such an optical resin, there are exemplified, for example, a plastic lens such as a spectacle lens for vision correction or a camera lens of a digital camera and the like. The optical components have been put to practical use and have come into use. In particular, for the purpose of use in a spectacle lens for vision correction, the plastic lens is lightweight and hardly broken, and can be tinted for granting great fashionability, as compared to the lens made of an inorganic glass. Making good use of such merits, the plastic lens has been widely used.

In the past, a crosslinking type resin obtained by casting polymerization of diethylene glycol bisallylcarbonate (hereinafter referred to as DAC) as an optical resin used for a spectacle lens under heating has been put to practical use. It has merits such that transparency and heat resistance are excellent, and the chromatic aberration is low (Abbe number is high). Due to such merits, it has been used the most for a general-purpose plastic spectacle lens for vision correction. However, there are problems such that wearing comfort and fashionability are worsened and the like since the central or edge thickness of the plastic lens becomes large because of the low refractive index (nd=1.50). Therefore, a resin for a plastic lens with a high refractive index capable of solving these problems has been demanded and developed accordingly.

During such a trend, since polythiourethane containing a sulfur atom obtained by casting polymerization of a diisocyanate compound with a polythiol compound is excellent in its transparency and impact resistance, while attaining a high refractive index (nd=1.6 to 1.7), and having relatively high abbe number and the like. By achieving such highly superior characteristics, polythiourethane has been used for the purpose of a high-quality plastic spectacle lens for vision correction in which the thickness is thin and its weight is light.

On the other hand, in a trend to pursue an optical resin having a much higher refractive index, there have been proposed several resins such as a transparent resin obtained by polymerization of a compound having an episulfide group in Patent Documents 1 and 2, a resin obtained by polymerization of a metal-containing compound such as Se in Patent Documents 3 and 4 or the like. However, the transparent resin obtained by polymerization of a compound having an episulfide group has a problem in mechanical properties, while the resin obtained by polymerization of a Se-containing metal compound has a problem in safety. Therefore, they have been demanded for further improvement. In recent years, there has been demanded an optical resin having required general properties (transparency, thermal properties, mechanical properties and the like) as a plastic lens, while attaining a much higher refractive index (nd) exceeding 1.7. The development of such an optical resin has been made.

[Patent Document 1] Japanese Patent Laid-Open No. 1997-110979
[Patent Document 2] Japanese Patent Laid-Open No. 1999-322930
[Patent Document 3] Japanese Patent Laid-Open No. 1999-140046
[Patent Document 4] Japanese Patent Laid-Open No. 2001-296402

DISCLOSURE OF THE INVENTION

An object of the present invention is to provide a polymerizable compound, which has general properties (transparency, thermal properties, mechanical properties and the like) required for optical components such as plastic lenses, while attaining a very high refractive index (nd) exceeding 1.7, a resin obtained by polymerization of the compound, and an optical component composed of the resin.

In order to solve the above problems, the present inventors have conducted an extensive study and, as a result, the present invention has been completed.

That is, the following matters specify the present invention.
[1] a compound comprising one or two or more thietane groups and a metal atom in a molecule;
[2] a compound comprising one or two or more thietane groups represented by the general formulae (1) and/or (2), and a metal atom,

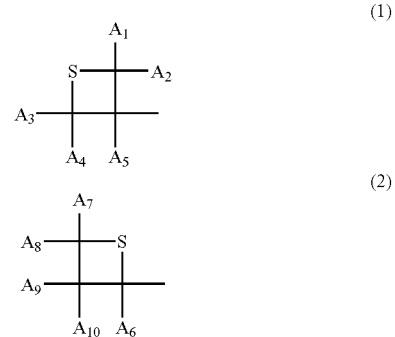

wherein, in the formula, $A_1$ to $A_{10}$ each independently represent a hydrogen atom or a monovalent inorganic or organic residue;
[3] a compound having one or two or more thietane groups in a molecule, and comprising a metal atom selected from an Sn atom, an Si atom, a Zr atom, a Ge atom, a Ti atom, a Zn atom, an Al atom, a Fe atom, a Cu atom, a Pt atom, a Pb atom, an Au atom or an Ag atom;

[4] a compound represented by the general formula (3),

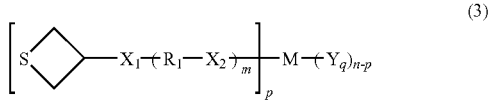

(3)

wherein, in the formula, M represents a metal atom; $X_1$ and $X_2$ each independently represent a sulfur atom or an oxygen atom; $R_1$ represents a divalent organic group; m represents an integer of 0 or 1 or more; p represents an integer of from 1 to n; q represents an integer of from 1 to (n−p); n represents a valence of a metal atom M; Yq each independently represent an inorganic or organic residue; and when q is 2 or more, Yq may be bonded to one another for forming a ring structure with the intermediary of a metal atom M;

[5] a polymerizable composition comprising the aforementioned compound;

[6] a resin obtained by polymerization of the aforementioned polymerizable composition; and

[7] an optical component composed of the aforementioned resin.

The resin obtained by polymerization of the polymerizable compound of the present invention has high transparency, good heat resistance and mechanical strength, while attaining a high refractive index (nd) exceeding 1.7. Therefore, the resin of the present invention is useful as a resin used in an optical component such as a plastic lenses or the like.

BEST MODE FOR CARRYING OUT THE INVENTION

The present invention will be described in more detail below.

The present invention relates to a compound having one or two or more thietane groups in a molecule and comprising a metal atom.

Examples of the metal atom used in the compound of the present invention preferably include an Sn atom, an Si atom, a Zr atom, a Ge atom, a Ti atom, a Zn atom, an Al atom, a Fe atom, a Cu atom, a Pt atom, a Pb atom, an Au atom or an Ag atom, more preferably an Sn atom, an Si atom, a Zr atom, a Ti atom, a Ge atom, an Al atom, a Pb atom or a Zn atom, and further preferably an Sn atom, an Si atom, a Zr atom, a Ti atom or a Ge atom.

Preferable examples of the thietane group contained in the compound of the present invention are thietane groups represented by the general formula (1) or (2),

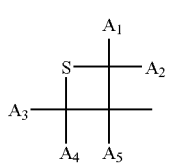

(1)

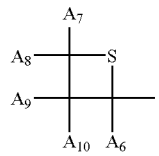

(2)

wherein, in the formula, $A_1$ to $A_{10}$ each independently represent a hydrogen atom, or a monovalent inorganic or organic residue.

$A_1$ to $A_{10}$ in the general formula (1) or (2) each independently represent a hydrogen atom, or a monovalent inorganic or organic residue.

Examples of the monovalent inorganic or organic residue include a halogen atom, a hydroxyl group, a thiol group, a substituted or unsubstituted alkyl group, a substituted or unsubstituted aryl group, a substituted or unsubstituted aralkyl group, a substituted or unsubstituted alkoxy group, a substituted or unsubstituted alkylthio group, a substituted or unsubstituted aryloxy group, and a substituted or unsubstituted arylthio group.

Concrete examples of the halogen atom include a fluorine atom, a chlorine atom, a bromine atom, and an iodine atom.

Concrete examples of the substituted or unsubstituted alkyl group include a linear alkyl group having 1 to 10 carbon atoms in total such as a methyl group, an ethyl group, an n-propyl group, an n-butyl group, an n-pentyl group, an n-hexyl group and the like;

a branched alkyl group having 3 to 10 carbon atoms in total such as an isopropyl group, an isobutyl group, a sec-butyl group, an isopentyl group, a sec-pentyl group, a 1-methylpentyl group, a 2-methylpentyl group, a 3-methylpentyl group, a 4-methylpentyl group, a 1-ethylbutyl group, a 2-ethylbutyl group, a 1-methylhexyl group, a 2-methylhexyl group, a 3-methylhexyl group, a 4-methylhexyl group, a 5-methylhexyl group, a 1-ethylpentyl group, a 2-ethylpentyl group, a 3-ethylpentyl group, a 1-n-propylbutyl group, a 1-iso-propylbutyl group, a 1-iso-propyl-2-methylpropyl group, a 1-methylheptyl group, a 2-methylheptyl group, a 3-methylheptyl group, a 4-methylheptyl group, a 5-methylheptyl group, a 6-methylheptyl group, a 1-ethylhexyl group, a 2-ethylhexyl group, a 3-ethylhexyl group, a 4-ethylhexyl group, a 1-n-propylpentyl group, a 2-n-propylpentyl group, a 1-iso-propylpentyl group, a 2-iso-propylpentyl group, a 1-n-butylbutyl group, a 1-iso-butylbutyl group, a 1-sec-butylbutyl group, a 1-tert-butylbutyl group, a 2-tert-butylbutyl group, a tert-butyl group, a tert-pentyl group, a 1,1-dimethylbutyl group, a 1,2-dimethylbutyl group, a 1,3-dimethylbutyl group, a 2,3-dimethylbutyl group, a 1-ethyl-2-methylpropyl group, a 1,1-dimethylpentyl group, a 1,2-dimethylpentyl group, a 1,3-dimethylpentyl group, a 1,4-dimethylpentyl group, a 2,2-dimethylpentyl group, a 2,3-dimethylpentyl group, a 2,4-dimethylpentyl group, a 3,3-dimethylpentyl group, a 3,4-dimethylpentyl group, a 1-ethyl-1-methylbutyl group, a 1-ethyl-2-methylbutyl group, a 1-ethyl-3-methylbutyl group, a 2-ethyl-1-methylbutyl group, a 2-ethyl-3-methylbutyl group, a 1,1-dimethylhexyl group, a 1,2-dimethylhexyl group, a 1,3-dimethylhexyl group, a 1,4-dimethylhexyl group, a 1,5-dimethylhexyl group, a 2,2-dimethylhexyl group, a 2,3-dimethylhexyl group, a 2,4-dimethylhexyl group, a 2,5-dimethylhexyl group, a 3,3-dimethylhexyl group, a 3,4-dimethylhexyl group, a 3,5-dimethylhexyl group, a 4,4-dimethylhexyl group, a 4,5-dimethylhexyl group, a 1-ethyl-2-methylpentyl group, a 1-ethyl-3-methylpentyl group, a 1-ethyl-4-methylpentyl group, a 2-ethyl-1- methylpentyl group, a 2-ethyl-2-methylpentyl group, a 2-ethyl-3-methylpentyl group, a 2-ethyl-4-methylpentyl group, a 3-ethyl-1-methylpentyl group, a 3-ethyl-2-methylpentyl group, a 3-ethyl-3-methylpentyl group, a 3-ethyl-4-methylpentyl group, a 1-n-propyl-1-methylbutyl group, a 1-n-propyl-2-methylbutyl group, a 1-n-propyl-3-methylbutyl group, a 1-iso-propyl-1-methylbutyl group, a 1-iso-propyl-2-methylbutyl group, a 1-iso-propyl-3-methylbutyl group, a 1,1-diethylbutyl group, a 1,2-diethylbutyl group, a 1,1,2-trimethylpropyl group, a 1,2,2-trimethylpropyl group, a 1,1,2-trimethylbutyl group, a 1,1,3-trimethylbutyl group, a 1,2,3-trimethylbutyl group, a 1,2,2-trimethylbutyl group, a 1,3,3-trimethylbutyl group, a 2,3,3-trimethylbutyl group, a 1,1,2-trimethylpentyl group, a 1,1,3-trimethylpentyl group, a 1,1,4-trimethylpentyl group, a 1,2,2-trimethylpentyl group, a 1,2,3-trimethylpentyl group, a 1,2,4-trimethylpentyl group, a 1,3,4-trimethylpentyl group, a 2,2,3-trimethylpentyl group, a 2,2,4-trimethylpentyl group, a 2,3,4-trimethylpentyl group, a 1,3,3-trimethylpentyl group, a 2,3,3-trimethylpentyl group, a 3,3,4-trimethylpentyl group, a 1,4,4-trimethylpentyl group, a 2,4,4-trimethylpentyl group, a 3,4,4-trimethylpentyl group, a 1-ethyl-1,2-dimethylbutyl group, a 1-ethyl-1,3-dimethylbutyl group, a 1-ethyl-2,3-dimethylbutyl group, a 2-ethyl-1,1-dimethylbutyl group, a 2-ethyl-1,2-dimethylbutyl group, a 2-ethyl-1,3-dimethylbutyl group, a 2-ethyl-2,3-dimethylbutyl group and the like; and a saturated cyclic alkyl group having 5 to 10 carbon atoms in total such as a cyclopentyl group, a cyclohexyl group, a methylcyclopentyl group, a methoxycyclopentyl group, a methoxycyclohexyl group, a methylcyclohexyl group, a 1,2-dimethylcyclohexyl group, a 1,3-dimethylcyclohexyl group, a 1,4-dimethylcyclohexyl group, an ethylcyclohexyl group and the like.

Concrete examples of the substituted or unsubstituted aryl group include aromatic hydrocarbons having not more than 20 carbon atoms in total such as a phenyl group, a naphthyl group, an anthranyl group, a cyclopentadienyl group and the like;

an alkyl-substituted aryl group having not more than 20 carbon atoms in total such as a 2-methylphenyl group, a 3-methylphenyl group, a 4-methylphenyl group, a 2-ethylphenyl group, a propylphenyl group, a butylphenyl group, a hexylphenyl group, a cyclohexylphenyl group, an octylphenyl group, a 2-methyl-1-naphthyl group, a 3-methyl-1-naphthyl group, a 4-methyl-1-naphthyl group, a 5-methyl-1-naphthyl group, a 6-methyl-1-naphthyl group, a 7-methyl-1-naphthyl group, a 8-methyl-1-naphthyl group, a 1-methyl-2-naphthyl group, a 3-methyl-2-naphthyl group, a 4-methyl-2-naphthyl group, a 5-methyl-2-naphthyl group, a 6-methyl-2-naphthyl group, a 7-methyl-2-naphthyl group, a 8-methyl-2-naphthyl group, a 2-ethyl-1-naphthyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a 2,3,4-trimethylphenyl group, a 2,3,5-trimethylphenyl group, a 2,3,6-trimethylphenyl group, a 2,4,5-trimethylphenyl group, a 2,4,6-trimethylphenyl group, a 3,4,5-trimethylphenyl group and the like;

a monoalkoxyaryl group having not more than 20 carbon atoms in total wherein a substituted or unsubstituted alkyloxy group having not more than 10 carbon atoms is substituted, such as a 2-methoxyphenyl group, a 3-methoxyphenyl group, a 4-methoxyphenyl group, a 2-ethoxyphenyl group, a propoxyphenyl group, a butoxyphenyl group, a hexyloxyphenyl group, a cyclohexyloxyphenyl group, an octyloxyphenyl group, a 2-methoxy-1-naphthyl group, a 3-methoxy-1-naphthyl group, a 4-methoxy-1-naphthyl group, a 5-methoxy-1-naphthyl group, a 6-methoxy-1-naphthyl group, a 7-methoxy-1-naphthyl group, a 8-methoxy-1-naphthyl group, a 1-methoxy-2-naphthyl group, a 3-methoxy-2-naphthyl group, a 4-methoxy-2-naphthyl group, a 5-methoxy-2-naphthyl group, a 6-methoxy-2-naphthyl group, a 7-methoxy-2-naphthyl group, a 8-methoxy-2-naphthyl group, a 2-ethoxy-1-naphthyl group and the like;

a dialkoxyaryl group having not more than 20 carbon atoms in total wherein a substituted or unsubstituted alkyloxy group having not more than 10 carbon atoms is substituted, such as a 2,3-dimethoxyphenyl group, a 2,4-dimethoxyphenyl group, a 2,5-dimethoxyphenyl group, a 2,6-dimethoxyphenyl group, a 3,4-dimethoxyphenyl group, a 3,5-dimethoxyphenyl group, a 3,6-dimethoxyphenyl group, a 4,5-dimethoxy-1-naphthyl group, a 4,7-dimethoxy-1-naphthyl group, a 4,8-dimethoxy-1-naphthyl group, a 5,8-dimethoxy-1-naphthyl group, a 5,8-dimethoxy-2-naphthyl group and the like;

a trialkoxyaryl group having not more than 20 carbon atoms in total wherein a substituted or unsubstituted alkyloxy group having nor more than 10 carbon atoms is substituted, such as a 2,3,4-trimethoxyphenyl group, a 2,3,5-trimethoxyphenyl group, a 2,3,6-trimethoxyphenyl group, a 2,4,5-trimethoxyphenyl group, a 2,4,6-trimethoxyphenyl group, a 3,4,5-trimethoxyphenyl group and the like; and an aryl group having not more than 20 carbon atoms in total wherein a halogen atom is substituted, such as a chlorophenyl group, a dichlorophenyl group, a trichlorophenyl group, a bromophenyl group, a dibromophenyl group, an iodophenyl group, a fluorophenyl group, a chloronaphthyl group, a bromonaphthyl group, a difluorophenyl group, a trifluorophenyl group, a tetrafluorophenyl group, a pentafluorophenyl group and the like.

Concrete examples of the substituted or unsubstituted aralkyl group include a benzyl group, a phenethyl group, a phenylpropyl group, a naphthylethyl group, or a methyl group, an ethyl group and a propyl group having an aryl group specifically mentioned as examples of the substituted or unsubstituted aryl group beforehand in a side chain.

Concrete examples of the substituted or unsubstituted alkyloxy group include a linear or branched alkoxy group having 1 to 10 carbon atoms in total such as a methoxy group, an ethoxy group, an n-propoxy group, an iso-propoxy group, an n-butoxy group, an iso-butoxy group, a tert-butoxy group, an n-pentyloxy group, an iso-pentyloxy group, an n-hexyloxy group, an iso-hexyloxy group, a 2-ethylhexyloxy group, a 3,5,5-trimethylhexyloxy group, an n-heptyloxy group, an n-octyloxy group, an n-nonyloxy group and the like;

a cycloalkoxy group having 5 to 10 carbon atoms in total such as a cyclopentyloxy group, a cyclohexyloxy group and the like;

an alkoxyalkoxy group having 1 to 10 carbon atoms in total such as a methoxymethoxy group, an ethoxymethoxy group, an ethoxyethoxy group, an n-propoxymethoxy group, an iso-propoxymethoxy group, an n-propoxyethoxy group, an iso-propoxyethoxy group, an n-butoxyethoxy group, an iso-butoxyethoxy group, a tert-butoxyethoxy group, an n-pentyloxyethoxy group, an iso-pentyloxyethoxy group, an n-hexyloxyethoxy group, an iso-hexyloxyethoxy group, an n-heptyloxyethoxy group and the like; and an aralkyloxy group such as a benzyloxy group.

Concrete examples of the substituted or unsubstituted alkylthio group include a linear or branched alkylthio group having 1 to 10 carbon atoms in total such as a methylthio group, an ethylthio group, an n-propylthio group, an i-propylthio group, an n-butylthio group, an i-butylthio group, a sec-butylthio group, a t-butylthio group, an n-pentylthio group, an iso-pentylthio group, an n-hexylthio group, an iso-hexylthio group, a 2-ethylhexylthio group, a 3,5,5-trimethylhexylthio group, an n-heptylthio group, an n-octylthio group, an n-nonylthio group and the like;
a cycloalkylthio group having 5 to 10 carbon atoms in total such as a cyclopentylthio group, a cyclohexylthio group and the like;
an alkoxyalkylthio group having 1 to 10 carbon atoms in total such as a methoxyethylthio group, an ethoxyethylthio group, an n-propoxyethylthio group, an iso-propoxyethylthio group, an n-butoxyethylthio group, an iso-butoxyethylthio group, a tert-butoxyethylthio group, an n-pentyloxyethylthio group, an iso-pentyloxyethylthio group, an n-hexyloxyethylthio group, an iso-hexyloxyethylthio group, an n-heptyloxyethylthio group and the like;
an aralkylthio group such as a benzylthio group and the like; and
an alkylthioalkylthio group having 1 to 10 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group, an n-pentylthioethylthio group, an iso-pentylthioethylthio group, an n-hexylthioethylthio group, an iso-hexylthioethylthio group, an n-heptylthioethylthio group and the like.

Concrete examples of the substituted or unsubstituted aryloxy group include an unsubstituted or alkyl-substituted aryloxy group having not more than 20 carbon atoms in total such as a phenyloxy group, a naphthyloxy group, an anthranyloxy group, a 2-methylphenyloxy group, a 3-methylphenyloxy group, a 4-methylphenyloxy group, a 2-ethylphenyloxy group, a propylphenyloxy group, a butylphenyloxy group, a hexylphenyloxy group, a cyclohexylphenyloxy group, an octylphenyloxy group, a 2-methyl-1-naphthyloxy group, a 3-methyl-1-naphthyloxy group, a 4-methyl-1-naphthyloxy group, a 5-methyl-1-naphthyloxy group, a 6-methyl-1-naphthyloxy group, a 7-methyl-1-naphthyloxy group, a 8-methyl-1-naphthyloxy group, a 1-methyl-2-naphthyloxy group, a 3-methyl-2-naphthyloxy group, a 4-methyl-2-naphthyloxy group, a 5-methyl-2-naphthyloxy group, a 6-methyl-2-naphthyloxy group, a 7-methyl-2-naphthyloxy group, a 8-methyl-2-naphthyloxy group, a 2-ethyl-1-naphthyloxy group, a 2,3-dimethylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group, a 2,3,4-trimethylphenyloxy group, a 2,3,5-trimethylphenyloxy group, a 2,3,6-trimethylphenyloxy group, a 2,4,5-trimethylphenyloxy group, a 2,4,6-trimethylphenyloxy group, a 3,4,5-trimethylphenyloxy group and the like;
a monoalkoxyaryloxy group having not more than 20 carbon atoms in total wherein a substituted or unsubstituted alkyloxy group having not more than 10 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group, a butoxyphenyloxy group, a hexyloxyphenyloxy group, a cyclohexyloxyphenyloxy group, an octyloxyphenyloxy group, a 2-methoxy-1-naphthyloxy group, a 3-methoxy-1-naphthyloxy group, a 4-methoxy-1-naphthyloxy group, a 5-methoxy-1-naphthyloxy group, a 6-methoxy-1-naphthyloxy group, a 7-methoxy-1-naphthyloxy group, a 8-methoxy-1-naphthyloxy group, a 1-methoxy-2-naphthyloxy group, a 3-methoxy-2-naphthyloxy group, a 4-methoxy-2-naphthyloxy group, a 5-methoxy-2-naphthyloxy group, a 6-methoxy-2-naphthyloxy group, a 7-methoxy-2-naphthyloxy group, a 8-methoxy-2-naphthyloxy group, a 2-ethoxy-1-naphthyloxy group and the like;
a dialkoxyaryloxy group having not more than 20 carbon atoms in total wherein a substituted or unsubstituted alkyloxy group having not more than 10 carbon atoms is substituted, such as a 2,3-dimethoxyphenyloxy group, a 2,4-dimethoxyphenyloxy group, a 2,5-dimethoxyphenyloxy group, a 2,6-dimethoxyphenyloxy group, a 3,4-dimethoxyphenyloxy group, a 3,5-dimethoxyphenyloxy group, a 3,6-dimethoxyphenyloxy group, a 4,5-dimethoxy-1-naphthyloxy group, a 4,7-dimethoxy-1-naphthyloxy group, a 4,8-dimethoxy-1-naphthyloxy group, a 5,8-dimethoxy-1-naphthyloxy group, a 5,8-dimethoxy-2-naphthyloxy group and the like;
a trialkoxyaryloxy group having not more than 20 carbon atoms in total wherein a substituted or unsubstituted alkyloxy group having not more than 10 carbon atoms is substituted, such as a 2,3,4-trimethoxyphenyloxy group, a 2,3,5-trimethoxyphenyloxy group, a 2,3,6-trimethoxyphenyloxy group, a 2,4,5-trimethoxyphenyloxy group, a 2,4,6-trimethoxyphenyloxy group, a 3,4,5-trimethoxyphenyloxy group and the like; and
an aryloxy group having not more than 20 carbon atoms in total wherein a halogen atom is substituted, such as a chlorophenyloxy group, a dichlorophenyloxy group, a trichlorophenyloxy group, a bromophenyloxy group, a dibromophenyloxy group, an iodophenyloxy group, a fluorophenyloxy group, a chloronaphthyloxy group, a bromonaphthyloxy group, a difluorophenyloxy group, a trifluorophenyloxy group, a tetrafluorophenyloxy group, a pentafluorophenyloxy group and the like.

Concrete examples of the substituted or unsubstituted arylthio group include an unsubstituted or alkyl-substituted arylthio group having not more than 20 carbon atoms in total such as a phenylthio group, a naphthylthio group, an anthranylthio group, a 2-methylphenylthio group, a 3-methylphenylthio group, a 4-methylphenylthio group, a 2-ethylphenylthio group, a propylphenylthio group, a butylphenylthio group, a hexylphenylthio group, a cyclohexylphenylthio group, an octylphenylthio group, a 2-methyl-1-naphthylthio group, a 3-methyl-1-naphthylthio group, a 4-methyl-1-naphthylthio group, a 5-methyl-1-naphthylthio group, a 6-methyl-1-naphthylthio group, a 7-methyl-1-naphthylthio group, a 8-methyl-1-naphthylthio group, a 1-methyl-2-naphthylthio group, a 3-methyl-2-naphthylthio group, a 4-methyl-2-naphthylthio group, a 5-methyl-2-naphthylthio group, a 6-methyl-2-naphthylthio group, a 7-methyl-2-naphthylthio group, a 8-methyl-2-naphthylthio group, a 2-ethyl-1-naphthylthio group, a 2,3-dimethylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group, a 2,3,4-trimethylphenylthio group, a 2,3,5-trimethylphenylthio group, a 2,3,6-trimethylphenylthio group, a 2,4,5-trimethylphenylthio group, a 2,4,6-trimethylphenylthio group, a 3,4,5-trimethylphenylthio group and the like;
a monoalkoxyarylthio group having not more than 20 carbon atoms in total wherein a substituted or unsubstituted alkyloxy group having not more than 10 carbon atoms is substituted, such as a 2-methoxyphenylthio group, a 3-methoxyphenylthio group, a 4-methoxyphenylthio group, a 2-ethoxyphenylthio group, a propoxyphenylthio group, a butoxyphenylthio group, a hexyloxyphenylthio group, a cyclohexyloxyphenylthio group, an octyloxyphenylthio group, a 2-methoxy-1-naphthylthio group, a 3-methoxy-1-naphthylthio group, a 4-methoxy-1-naphthylthio group, a 5-methoxy-1-naphthylthio group, a 6-methoxy-1-naphthylthio group, a 7-methoxy-1-naphthylthio group, a 8-methoxy-1-naphthylthio group, a 1-methoxy-2-naphthylthio group, a 3-methoxy-2-naphthylthio group, a 4-methoxy-2- naphthylthio group, a 5-methoxy-2-naphthylthio group, a 6-methoxy-2-naphthylthio group, a 7-methoxy-2-naphthylthio group, a 8-methoxy-2-naphthylthio group, a 2-ethoxy-1-naphthylthio group and the like;

a dialkoxyarylthio group having not more than 20 carbon atoms in total wherein a substituted or unsubstituted alkyloxy group having not more than 10 carbon atoms is substituted, such as a 2,3-dimethoxyphenylthio group, a 2,4-dimethoxyphenylthio group, a 2,5-dimethoxyphenylthio group, a 2,6-dimethoxyphenylthio group, a 3,4-dimethoxyphenylthio group, a 3,5-dimethoxyphenylthio group, a 3,6-dimethoxyphenylthio group, a 4,5-dimethoxy-1-naphthylthio group, a 4,7-dimethoxy-1-naphthylthio group, a 4,8-dimethoxy-1-naphthylthio group, a 5,8-dimethoxy-1-naphthylthio group, a 5,8-dimethoxy-2-naphthylthio group and the like;

a trialkoxyarylthio group having not more than 20 carbon atoms in total wherein a substituted or unsubstituted alkyloxy group having not more than 10 carbon atoms is substituted, such as a 2,3,4-trimethoxyphenylthio group, a 2,3,5-trimethoxyphenylthio group, a 2,3,6-trimethoxyphenylthio group, a 2,4,5-trimethoxyphenylthio group, a 2,4,6-trimethoxyphenylthio group, a 3,4,5-trimethoxyphenylthio group and the like; and an arylthio group having not more than 20 carbon atoms in total wherein a halogen atom is substituted, such as a chlorophenylthio group, a dichlorophenylthio group, a trichlorophenylthio group, a bromophenylthio group, a dibromophenylthio group, an iodophenylthio group, a fluorophenylthio group, a chloronaphthylthio group, a bromonaphthylthio group, a difluorophenylthio group, a trifluorophenylthio group, a tetrafluorophenylthio group, a pentafluorophenylthio group and the like. However, the present invention is not restricted thereto.

$A_1$ to $A_{10}$ preferably represent a hydrogen atom. Preferable examples of the halogen atom include a chlorine atom, a bromine atom and an iodine atom.

Preferable examples of the substituted or unsubstituted alkyl group include a linear alkyl group having 1 to 6 carbon atoms in total such as a methyl group, an ethyl group, an n-propyl group, an n-butyl group, an n-pentyl group, an n-hexyl group and the like;

a branched alkyl group having 3 to 6 carbon atoms in total such as an isopropyl group, an isobutyl group, a sec-butyl group, an isopentyl group, a sec-pentyl group, a 1-methylpentyl group, a 2-methylpentyl group, a 3-methylpentyl group, a 4-methylpentyl group, a 1-ethylbutyl group, a 2-ethylbutyl group, a tert-butyl group, a tert-pentyl group, a 1,1-dimethylbutyl group, a 1,2-dimethylbutyl group, a 1,3-dimethylbutyl group, a 2,3-dimethylbutyl group and the like; and a saturated cyclic alkyl group having 5 to 6 carbon atoms in total such as a cyclopentyl group, a cyclohexyl group and the like.

Preferable examples of the substituted or unsubstituted aryl group include aromatic hydrocarbons having not more than 12 carbon atoms in total such as a phenyl group, a naphthyl group, a cyclopentadienyl group and the like;

an alkyl-substituted aryl group having not more than 12 carbon atoms in total such as a 2-methylphenyl group, a 3-methylphenyl group, a 4-methylphenyl group, a 2-ethylphenyl group, a propylphenyl group, a butylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a 2,3,4-trimethylphenyl group, a 2,3,5-trimethylphenyl group, a 2,3,6-trimethylphenyl group, a 2,4,5-trimethylphenyl group, a 2,4,6-trimethylphenyl group, a 3,4,5-trimethylphenyl group and the like;

a monoalkoxyaryl group having not more than 12 carbon atoms in total wherein a substituted or unsubstituted alkyloxy group having not more than 6 carbon atoms is substituted, such as a 2-methoxyphenyl group, a 3-methoxyphenyl group, a 4-methoxyphenyl group, a 2-ethoxyphenyl group, a propoxyphenyl group, a butoxyphenyl group and the like;

a dialkoxyaryl group having not more than 12 carbon atoms in total wherein a substituted or unsubstituted alkyloxy group having not more than 6 carbon atoms is substituted, such as a 2,3-dimethoxyphenyl group, a 2,4-dimethoxyphenyl group, a 2,5-dimethoxyphenyl group, a 2,6-dimethoxyphenyl group, a 3,4-dimethoxyphenyl group, a 3,5-dimethoxyphenyl group, a 3,6-dimethoxyphenyl group and the like; and an aryl group having not more than 12 carbon atoms in total wherein a halogen atom is substituted, such as a chlorophenyl group, a dichlorophenyl group, a trichlorophenyl group, a bromophenyl group, a dibromophenyl group, an iodophenyl group, a fluorophenyl group, a chloronaphthyl group, a bromonaphthyl group, a difluorophenyl group, a trifluorophenyl group, a tetrafluorophenyl group, a pentafluorophenyl group and the like.

Preferable examples of the substituted or unsubstituted aralkyl group include an aralkyl group having not more than 12 carbon atoms in total such as a benzyl group, a phenethyl group, a phenylpropyl group and the like.

Preferable examples of the substituted or unsubstituted alkyloxy group include a linear or branched alkoxy group having 1 to 6 carbon atoms in total such as a methoxy group, an ethoxy group, an n-propoxy group, an iso-propoxy group, an n-butoxy group, an iso-butoxy group, a tert-butoxy group, an n-pentyloxy group, an iso-pentyloxy group, an n-hexyloxy group, an iso-hexyloxy group and the like;

a cycloalkoxy group having 5 to 6 carbon atoms in total such as a cyclopentyloxy group, a cyclohexyloxy group and the like; and an alkoxyalkoxy group having 1 to 6 carbon atoms in total such as a methoxymethoxy group, an ethoxymethoxy group, an ethoxyethoxy group, an n-propoxymethoxy group, an iso-propoxymethoxy group, an n-propoxyethoxy group, an iso-propoxyethoxy group, an n-butoxyethoxy group, an iso-butoxyethoxy group, a tert-butoxyethoxy group and the like.

Preferable examples of the substituted or unsubstituted alkylthio group include a linear or branched alkylthio group having 1 to 6 carbon atoms in total such as a methylthio group, an ethylthio group, an n-propylthio group, an i-propylthio group, an n-butylthio group, an i-butylthio group, a sec-butylthio group, a t-butylthio group, an n-pentylthio group, an iso-pentylthio group, an n-hexylthio group, an iso-hexylthio group and the like;

a cycloalkylthio group having 5 to 6 carbon atoms in total such as a cyclopentylthio group, a cyclohexylthio group and the like;

an alkoxyalkylthio group having 1 to 6 carbon atoms in total such as a methoxyethylthio group, an ethoxyethylthio group, an n-propoxyethylthio group, an iso-propoxyethylthio group, an n-butoxyethylthio group, an iso-butoxyethylthio group, a tert-butoxyethylthio group and the like; and an alkylthioalkylthio group having 1 to 6 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group and the like.

Preferable examples of the substituted or unsubstituted aryloxy group include an unsubstituted or alkyl-substituted aryloxy group having not more than 12 carbon atoms in total such as a phenyloxy group, a naphthyloxy group, a 2-methylphenyloxy group, a 3-methylphenyloxy group, a 4-methylphenyloxy group, a 2-ethylphenyloxy group, a propylphenyloxy group, a butylphenyloxy group, a hexylphenyloxy group, a cyclohexylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group, a 2,3,4-trimethylphenyloxy group, a 2,3,5-trimethylphenyloxy group, a 2,3,6-trimethylphenyloxy group, a 2,4,5-trimethylphenyloxy group, a 2,4,6-trimethylphenyloxy group, a 3,4,5-trimethylphenyloxy group and the like;
a monoalkoxyaryloxy group having not more than 12 carbon atoms in total wherein a substituted or unsubstituted alkyloxy group having not more than 6 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group, a butoxyphenyloxy group, a hexyloxyphenyloxy group, a cyclohexyloxyphenyloxy group and the like;
a dialkoxyaryloxy group having not more than 12 carbon atoms in total wherein a substituted or unsubstituted alkyloxy group having not more than 6 carbon atoms is substituted, such as a 2,3-dimethoxyphenyloxy group, a 2,4-dimethoxyphenyloxy group, a 2,5-dimethoxyphenyloxy group, a 2,6-dimethoxyphenyloxy group, a 3,4-dimethoxyphenyloxy group, a 3,5-dimethoxyphenyloxy group, a 3,6-dimethoxyphenyloxy group and the like; and
an aryloxy group having not more than 12 carbon atoms in total wherein a halogen atom is substituted, such as a chlorophenyloxy group, a dichlorophenyloxy group, a trichlorophenyloxy group, a bromophenyloxy group, a dibromophenyloxy group, an iodophenyloxy group, a fluorophenyloxy group, a chloronaphthyloxy group, a bromonaphthyloxy group, a difluorophenyloxy group, a trifluorophenyloxy group, a tetrafluorophenyloxy group, a pentafluorophenyloxy group and the like.

Preferable examples of the substituted or unsubstituted arylthio group include an unsubstituted or alkyl-substituted arylthio group having not more than 12 carbon atoms in total such as a phenylthio group, a naphthylthio group, a 2-methylphenylthio group, a 3-methylphenylthio group, a 4-methylphenylthio group, a 2-ethylphenylthio group, a propylphenylthio group, a butylphenylthio group, a hexylphenylthio group, a cyclohexylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group, a 2,3,4-trimethylphenylthio group, a 2,3,5-trimethylphenylthio group, a 2,3,6-trimethylphenylthio group, a 2,4,5-trimethylphenylthio group, a 2,4,6-trimethylphenylthio group, a 3,4,5-trimethylphenylthio group and the like;
a monoalkoxyarylthio group having not more than 12 carbon atoms in total wherein a substituted or unsubstituted alkyloxy group having not more than 6 carbon atoms is substituted, such as a 2-methoxyphenylthio group, a 3-methoxyphenylthio group, a 4-methoxyphenylthio group, a 2-ethoxyphenylthio group, a propoxyphenylthio group, a butoxyphenylthio group, a hexyloxyphenylthio group, a cyclohexyloxyphenylthio group and the like;
a dialkoxyarylthio group having not more than 12 carbon atoms in total wherein a substituted or unsubstituted alkyloxy group having not more than 6 carbon atoms is substituted, such as a 2,3-dimethoxyphenylthio group, a 2,4-dimethoxyphenylthio group, a 2,5-dimethoxyphenylthio group, a 2,6-dimethoxyphenylthio group, a 3,4-dimethoxyphenylthio group, a 3,5-dimethoxyphenylthio group, a 3,6-dimethoxyphenylthio group, a 4,5-dimethoxy-1-naphthylthio group, a 4,7-dimethoxy-1-naphthylthio group, a 4,8-dimethoxy-1-naphthylthio group, a 5,8-dimethoxy-1-naphthylthio group, a 5,8-dimethoxy-2-naphthylthio group and the like; and
an arylthio group having not more than 12 carbon atoms in total wherein a halogen atom is substituted, such as a chlorophenylthio group, a dichlorophenylthio group, a trichlorophenylthio group, a bromophenylthio group, a dibromophenylthio group, an iodophenylthio group, a fluorophenylthio group, a chloronaphthylthio group, a bromonaphthylthio group, a difluorophenylthio group, a trifluorophenylthio group, a tetrafluorophenylthio group, a pentafluorophenylthio group and the like.

More preferable example includes a hydrogen atom. More preferable examples of the halogen atom include a chlorine atom and a bromine atom.

More preferable examples of the substituted or unsubstituted alkyl group include a linear or branched alkyl group having 1 to 3 carbon atoms in total such as a methyl group, an ethyl group, an iso-propyl group and the like.

More preferable examples of the substituted or unsubstituted aryl group include aromatic hydrocarbons having not more than 12 carbon atoms in total such as a phenyl group, a naphthyl group, a cyclopentadienyl group and the like;
an alkyl-substituted aryl group having not more than 9 carbon atoms in total such as a 2-methylphenyl group, a 3-methylphenyl group, a 4-methylphenyl group, a 2-ethylphenyl group, a propylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group and the like;
a monoalkoxyaryl group having not more than 9 carbon atoms in total wherein a substituted or unsubstituted alkyloxy group having not more than 3 carbon atoms is substituted, such as a 2-methoxyphenyl group, a 3-methoxyphenyl group, a 4-methoxyphenyl group, a 2-ethoxyphenyl group, a propoxyphenyl group and the like; and
an aryl group having not more than 12 carbon atoms in total wherein a halogen atom is substituted, such as a chlorophenyl group, a dichlorophenyl group, a trichlorophenyl group, a bromophenyl group, a dibromophenyl group, a chloronaphthyl group, a bromonaphthyl group and the like.

More preferable examples of the substituted or unsubstituted aralkyl group include an aralkyl group having not more than 9 carbon atoms in total such as a benzyl group, a phenethyl group, a phenylpropyl group and the like.

More preferable examples of the substituted or unsubstituted alkyloxy group include a linear or branched alkoxy group having 1 to 3 carbon atoms in total such as a methoxy group, an ethoxy group, an iso-propoxy group and the like; and
a cycloalkoxy group having 5 to 6 carbon atoms in total such as a cyclopentyloxy group, a cyclohexyloxy group and the like.

More preferable examples of the substituted or unsubstituted alkylthio group include a linear or branched alkylthio group having 1 to 3 carbon atoms in total such as a methylthio group, an ethylthio group, an n-propylthio group, an i-propylthio group and the like;
a cycloalkylthio group having 5 to 6 carbon atoms in total such as a cyclopentylthio group, a cyclohexylthio group and the like; and
an alkylthioalkylthio group having 1 to 6 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group and the like.

More preferable examples of the substituted or unsubstituted aryloxy group include an unsubstituted or alkyl-substituted aryloxy group having not more than 9 carbon atoms in total such as a phenyloxy group, a naphthyloxy group, a 2-methylphenyloxy group, a 3-methylphenyloxy group, a 4-methylphenyloxy group, a 2-ethylphenyloxy group, a propylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group and the like; a monoalkoxyaryloxy group having not more than 9 carbon atoms in total wherein a substituted or unsubstituted alkyloxy group having not more than 3 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group and the like; and an aryloxy group having not more than 12 carbon atoms in total wherein a halogen atom is substituted, such as a chlorophenyloxy group, a dichlorophenyloxy group, a trichlorophenyloxy group, a bromophenyloxy group, a dibromophenyloxy group, a chloronaphthyloxy group, a bromonaphthyloxy group and the like.

More preferable examples of the substituted or unsubstituted arylthio group include an unsubstitued or alkyl-substituted arylthio group having not more than 9 carbon atoms in total such as a phenylthio group, a 2-methylphenylthio group, a 3-methylphenylthio group, a 4-methylphenylthio group, a 2-ethylphenylthio group, a propylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group and the like; a monoalkoxyarylthio group having not more than 9 carbon atoms in total wherein a substituted or unsubstituted alkyloxy group having not more than 3 carbon atoms is substituted, such as a 2-methoxyphenylthio group, a 3-methoxyphenylthio group, a 4-methoxyphenylthio group, a 2-ethoxyphenylthio group, a propoxyphenylthio group and the like; and an arylthio group having not more than 12 carbon atoms in total wherein a halogen atom is substituted, such as a chlorophenylthio group, a dichlorophenylthio group, a trichlorophenylthio group, a bromophenylthio group, a dibromophenylthio group, a chloronaphthylthio group, a bromonaphthylthio group and the like.

The thietane group represented by the general formula (1) or (2) is specifically exemplified in the following Tables 1 and 2. However, the thietane group is not restricted to the following.

TABLE 1

[Concrete examples of the thietane group represented by the general formula (1)]

| Thietane Group Nos. | $A_1$ | $A_2$ | $A_3$ | $A_4$ | $A_5$ |
|---|---|---|---|---|---|
| 1-1 | H | H | H | H | H |
| 1-2 | Cl | H | H | H | H |
| 1-3 | H | H | H | H | Cl |
| 1-4 | $CH_3$ | H | H | H | H |
| 1-5 | H | H | H | H | $CH_3$ |
| 1-6 | $C_2H_5$ | H | H | H | H |
| 1-7 | H | H | H | H | $C_2H_5$ |
| 1-8 | $C_6H_5$ | H | H | H | H |
| 1-9 | H | H | H | H | $C_6H_5$ |
| 1-10 | $CH_3S$ | H | H | H | H |
| 1-11 | H | H | H | H | $CH_3S$ |
| 1-12 | $C_6H_5S$ | H | H | H | H |
| 1-13 | H | H | H | H | $C_6H_5S$ |
| 1-14 | $CH_3O$ | H | H | H | H |
| 1-15 | H | H | H | H | $CH_3O$ |
| 1-16 | $C_6H_5O$ | H | H | H | H |
| 1-17 | H | H | H | H | $C_6H_5O$ |
| 1-18 | $C_6H_5CH_2$ | H | H | H | H |
| 1-19 | H | H | H | H | $C_6H_5CH_2$ |
| 1-20 | $CH_3$ | $CH_3$ | H | H | H |
| 1-21 | $C_2H_5$ | $C_2H_5$ | H | H | H |
| 1-22 | $C_6H_5$ | $C_6H_5$ | H | H | H |
| 1-23 | $CH_3S$ | $CH_3S$ | H | H | H |
| 1-24 | $C_6H_5S$ | $C_6H_5S$ | H | H | H |
| 1-25 | $CH_3O$ | $CH_3O$ | H | H | H |
| 1-26 | $C_6H_5O$ | $C_6H_5O$ | H | H | H |
| 1-27 | $CH_3$ | H | $CH_3$ | H | H |
| 1-28 | $C_6H_5$ | H | $C_6H_5$ | H | H |
| 1-29 | $CH_3S$ | H | $CH_3S$ | H | H |
| 1-30 | $C_6H_5S$ | H | $C_6H_5S$ | H | H |
| 1-31 | $CH_3$ | H | H | H | $CH_3$ |
| 1-32 | $C_6H_5$ | H | H | H | $C_6H_5$ |
| 1-33 | $CH_3S$ | H | H | H | $CH_3S$ |
| 1-34 | $C_6H_5S$ | H | H | H | $C_6H_5S$ |
| 1-35 | $CH_3O$ | H | H | H | $CH_3O$ |
| 1-36 | $C_6H_5O$ | H | H | H | $C_6H_5O$ |

TABLE 2

[Concrete examples of the thietane group represented by the general formula (2)]

| Thietane Group Nos. | $A_6$ | $A_7$ | $A_8$ | $A_9$ | $A_{10}$ |
|---|---|---|---|---|---|
| 2-1 | H | H | H | H | H |
| 2-2 | Cl | H | H | H | H |
| 2-3 | H | Cl | H | H | H |
| 2-4 | H | H | H | Cl | H |
| 2-5 | $CH_3$ | H | H | H | H |
| 2-6 | H | $CH_3$ | H | H | H |
| 2-7 | H | H | H | $CH_3$ | H |
| 2-8 | $C_6H_5$ | H | H | H | H |
| 2-9 | H | $C_6H_5$ | H | H | H |
| 2-10 | H | H | H | $C_6H_5$ | H |
| 2-11 | $CH_3S$ | H | H | H | H |
| 2-12 | H | $CH_3S$ | H | H | H |
| 2-13 | H | H | H | $CH_3S$ | H |
| 2-14 | $C_6H_5S$ | H | H | H | H |
| 2-15 | H | $C_6H_5S$ | H | H | H |
| 2-16 | H | H | H | $C_6H_5S$ | H |
| 2-17 | $CH_3O$ | H | H | H | H |
| 2-18 | H | $CH_3O$ | H | H | H |
| 2-19 | H | H | H | $CH_3O$ | H |
| 2-20 | $C_6H_5O$ | H | H | H | H |
| 2-21 | H | $C_6H_5O$ | H | H | H |
| 2-22 | H | H | H | $C_6H_5O$ | H |
| 2-23 | $C_6H_5CH_2$ | H | H | H | H |
| 2-24 | H | $C_6H_5CH_2$ | H | H | H |
| 2-25 | H | H | H | $C_6H_5CH_2$ | H |
| 2-26 | H | $CH_3$ | $CH_3$ | H | H |
| 2-27 | H | $C_6H_5$ | $C_6H_5$ | H | H |
| 2-28 | H | $CH_3S$ | $CH_3S$ | H | H |
| 2-29 | H | $C_6H_5S$ | $C_6H_5S$ | H | H |
| 2-30 | H | $CH_3O$ | $CH_3O$ | H | H |
| 2-31 | H | $C_6H_5O$ | $C_6H_5O$ | H | H |
| 2-32 | H | H | H | $CH_3$ | $CH_3$ |
| 2-33 | H | H | H | $C_6H_5$ | $C_6H_5$ |
| 2-34 | H | H | H | $CH_3S$ | $CH_3S$ |
| 2-35 | H | H | H | $C_6H_5S$ | $C_6H_5S$ |
| 2-36 | H | H | H | $CH_3O$ | $CH_3O$ |

TABLE 2-continued

[Concrete examples of the thietane group represented by the general formula (2)]

| Thietane Group Nos. | $A_6$ | $A_7$ | $A_8$ | $A_9$ | $A_{10}$ |
|---|---|---|---|---|---|
| 2-37 | H | H | H | $C_6H_5O$ | $C_6H_5O$ |
| 2-38 | $CH_3$ | $CH_3$ | H | H | H |
| 2-39 | $CH_3$ | H | H | $CH_3$ | H |
| 2-40 | $C_6H_5$ | $C_6H_5$ | H | H | H |
| 2-41 | $C_6H_5$ | H | H | $C_6H_5$ | H |
| 2-42 | $CH_3S$ | $CH_3S$ | H | H | H |
| 2-43 | $CH_3S$ | H | H | $CH_3S$ | H |
| 2-44 | $C_6H_5S$ | $C_6H_5S$ | H | H | H |
| 2-45 | $C_6H_5S$ | H | H | $C_6H_5S$ | H |
| 2-46 | $CH_3O$ | $CH_3O$ | H | H | H |
| 2-47 | $CH_3O$ | H | H | $CH_3O$ | H |
| 2-48 | $C_6H_5O$ | $C_6H_5O$ | H | H | H |
| 2-49 | $C_6H_5O$ | H | H | $C_6H_5O$ | H |
| 2-50 | H | $CH_3$ | H | $CH_3$ | H |
| 2-51 | H | $C_6H_5$ | H | $C_6H_5$ | H |
| 2-52 | H | $CH_3S$ | H | $CH_3S$ | H |
| 2-53 | H | $C_6H_5S$ | H | $C_6H_5S$ | H |
| 2-54 | H | $CH_3O$ | H | $CH_3O$ | H |
| 2-55 | H | $C_6H_5O$ | H | $C_6H_5O$ | H |

Bonding of the thietane group represented by the general formula (1) or (2) to a metal atom in the present invention is not particularly limited. That is, the thietane group may be directly bonded to a metal atom, or may be bonded to a metal group through an appropriate linking group. Examples of the linking group include, though not restricted to, a chained or cyclic aliphatic group, an aromatic group, an aromatic-aliphatic group, or a group represented by the general formula (4),

(4)

wherein, in the formula, $X_1$, $X_2$, $R_1$ and m are the same as $X_1$, $X_2$, $R_1$ and m in the general formula (3). Concrete examples of the linking group include the following.

Concrete examples of the chained or cyclic aliphatic group include a substituted or unsubstituted chained or cyclic aliphatic group having 1 to 20 carbon atoms such as a methylene group, an ethylene group, a 1,2-dichloroethylene group, a trimethylene group, a tetramethylene group, a pentamethylene group, a cyclopentylene group, a hexamethylene group, a cyclohexylene group, a heptamethylene group, an octamethylene group, a nonamethylene group, a decamethylene group, an undecamethylene group, a dodecamethylene group, a tridecamethylene group, a tetradecamethylene group, a pentadecamethylene group and the like.

Concrete examples of the aromatic group or aromatic-aliphatic group include a substituted or unsubstituted aromatic group having 5 to 20 carbon atoms such as a phenylene group, a chlorophenylene group, a naphthylene group, an indenylene group, an anthracenylene group, a fluorenylene group and the like; and
a substituted or unsubstituted aromatic-aliphatic group having 6 to 20 carbon atoms such as a —$C_6H_4$—$CH_2$— group, a —$CH_2$—$C_6H_4$—$CH_2$— group, a —$CH_2$—$C_6H_3$ (Cl)—$CH_2$— group, a —$C_{10}H_6$—$CH_2$— group, a —$CH_2$—$C_{10}H_6$—$CH_2$— group, a —$CH_2CH_2$—$C_6H_4$—$CH_2CH_2$— group and the like.

Concrete examples of the group represented by the general formula (4) include those exemplified for $X_1$, $X_2$, $R_1$ and m in the general formula (3) to be described below and in combination thereof.

These linking groups may contain a heteroatom except for a carbon atom or a hydrogen atom in the group. Examples of the heteroatom include an oxygen atom or a sulfur atom. Considering the desired effect of the present invention, a sulfur atom is preferable.

The thietane group represented by the general formula (1) or (2) is preferably directly bonded to a metal atom.

Preferable examples of the chained or cyclic aliphatic group include a substituted or unsubstituted chained or cyclic aliphatic group having 1 to 6 carbon atoms such as a methylene group, an ethylene group, a 1,2-dichloroethylene group, a trimethylene group, a cyclopentylene group, a cyclohexylene group and the like.

Preferable examples of the aromatic group or aromatic-aliphatic group include a substituted or unsubstituted aromatic group having 5 to 15 carbon atoms such as a phenylene group, a chlorophenylene group, a naphthylene group, an indenylene group, an anthracenylene group, a fluorenylene group and the like; and
a substituted or unsubstituted aromatic-aliphatic group having 6 to 15 carbon atoms such as a —$C_6H_4$—$CH_2$— group, a —$CH_2$—$C_6H_4$—$CH_2$— group, a —$CH_2$—$C_6H_3$ (Cl)—$CH_2$— group, a —$C_{10}H_6CH_2$—group, a —$CH_2$—$C_{10}H_6$—$CH_2$— group, a —$CH_2CH_2$—$C_6H_4$—$CH_2CH_2$— group and the like.

Preferable examples of the group represented by the general formula (4) include those preferably exemplified for $X_1$, $X_2$, $R_1$ and m in the general formula (3) to be described below and in combination thereof.

Furthermore, the present invention may contain the thietane group represented by the general formula (1) or (2), and contain a plurality of other thietane groups represented by the general formula (1) or (2) in the same molecule.

Preferred examples of the compound of the present invention include compounds represented by the general formula (3),

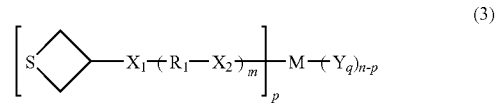

(3)

wherein, in the formula, M represents a metal atom; $X_1$ and $X_2$ each independently represent a sulfur atom or an oxygen atom; $R_1$ represents a divalent organic group; m represents an integer of 0 or 1 or more; p represents an integer of from 1 to n; q represents an integer of from 1 to (n−p); n represents a valence of a metal atom M; Yq each independently represent an inorganic or organic residue; and when q is 2 or more, Yq may be bonded to one another for forming a ring structure with the intermediary of a metal atom M.

M in the general formula (3) represents a metal atom, preferably an Sn atom, an Si atom, a Zr atom, a Ge atom, a Ti atom, a Zn atom, an Al atom, a Fe atom, a Cu atom, a Pt atom, a Pb atom, an Au atom or an Ag atom, more preferably an Sn atom, an Si atom, a Zr atom, a Ti atom, a Ge atom, an Al atom, a Pb atom or a Zn atom, and further preferably an Sn atom, an Si atom, a Zr atom, a Ti atom or a Ge atom. In the general formula (3), $X_1$ and $X_2$ each independently represent a sulfur atom or an oxygen atom. In consideration of the desired effect of the present invention, i.e., a high refractive index, as $X_1$ and $X_2$, preferably used is a sulfur atom.

In the general formula (3), $R_1$ represents a divalent organic group.

Examples of the divalent organic group include a chained or cyclic aliphatic group, an aromatic group or an aromatic-aliphatic group, preferably a chained aliphatic group having 1 to 20 carbon atoms, a cyclic aliphatic group having 3 to 20 carbon atoms, an aromatic group having 5 to 20 carbon atoms and an aromatic-aliphatic group having 6 to 20 carbon atoms.

More specifically, this divalent organic group is a chained or cyclic aliphatic group, an aromatic group or an aromatic-aliphatic group, preferably a substituted or unsubstituted chained or cyclic aliphatic group having 1 to 20 carbon atoms such as a methylene group, an ethylene group, a 1,2-dichloroethylene group, a trimethylene group, a tetramethylene group, a pentamethylene group, a cyclopentylene group, a hexamethylene group, a cyclohexylene group, a heptamethylene group, an octamethylene group, a nonamethylene group, a decamethylene group, an undecamethylene group, a dodecamethylene group, a tridecamethylene group, a tetradecamethylene group, a pentadecamethylene group and the like;
a substituted or unsubstituted aromatic group having 5 to 20 carbon atoms such as a phenylene group, a chlorophenylene group, a naphthylene group, an indenylene group, an anthracenylene group, a fluorenylene group and the like; and
a substituted or unsubstituted aromatic-aliphatic group having 6 to 20 carbon atoms such as a —$C_6H_4$—$CH_2$— group, a —$CH_2$—$C_6H_4$—$CH_2$— group, a —$CH_2$—$C_6H_3$ (Cl)—$CH_2$— group, a —$C_{10}H_6$—$CH_2$— group, a —$CH_2$—$C_{10}H_6$—$CH_2$— group, a —$CH_2CH_2$—$C_6H_4$—$CH_2CH_2$— group and the like,
and more preferably a substituted or unsubstituted chained or cyclic aliphatic group having 1 to 6 carbon atoms such as a methylene group, an ethylene group, a 1,2-dichloroethylene group, a trimethylene group, a cyclopentylene group, a cyclohexylene group and the like;
a substituted or unsubstituted aromatic group having 5 to 15 carbon atoms such as a phenylene group, a chlorophenylene group, a naphthylene group, an indenylene group, an anthracenylene group, a fluorenylene group and the like; and
a substituted or unsubstituted aromatic-aliphatic group having 6 to 15 carbon atoms such as a —$C_6H_4$—$CH_2$— group, a —$CH_2$—$C_6H_4$—$CH_2$— group, a —$CH_2$—$C_6H_3$ (Cl)—$CH_2$— group, a —$C_{10}H_6$—$CH_2$— group, a —$CH_2$—$C_{10}H_6$—$CH_2$— group, a —$CH_2CH_2$—$C_6H_4$—$CH_2CH_2$— group and the like.

This divalent organic group may contain a heteroatom except for a carbon atom or a hydrogen group in the group. Examples of the heteroatom include an oxygen atom or a sulfur atom. Considering the desired effect of the present invention, a sulfur atom is preferable.

In the general formula (3), m represents an integer of 0 or 1 or more.

Examples of m are preferably an integer of 0 to 4, more preferably an integer of 0 to 2, and further preferably an integer of 0 or 1.

In the general formula (3), n represents a valence of a metal atom M.

In the general formula (3), p represents an integer of 1 to n.

Examples of p preferably include n, n−1 or n−2 and more preferably n or n−1.

In the general formula (3), q represents an integer of 1 to (n−p).

In the general formula (3), Y's each independently represents an inorganic or organic residue.

Examples of the residue include a halogen atom, a hydroxyl group, an alkoxy group, an alkylthio group, an aryloxy group and an arylthio group. Of these, a halogen atom, an alkoxy group, an alkylthio group, an aryloxy group and an arylthio group are specifically the same as a halogen atom, an alkoxy group, an alkylthio group, an aryloxy group, an arylthio group in $A_1$ to $A_{10}$ of the general formulae (1) and (2). Furthermore, when q is an integer of 2 or more, Y's may, of course, be bonded to one another for forming a ring structure through the intermediary of the metal atom M.

The compound represented by the general formula (3) is specifically exemplified in the following Table 3. However, the compound is not restricted to the following.

TABLE 3-1

[Concrete examples of the compound represented by the general formula (3)]

| Compound Nos. | M | n | p | q | m | X1 | X2 | R1 | Y1 | Y2 | Y3 |
|---|---|---|---|---|---|---|---|---|---|---|---|
| 3-1 | Sn | 4 | 4 | 0 | 0 | S | — | — | — | — | — |
| 3-2 | Sn | 4 | 4 | 0 | 0 | O | — | — | — | — | — |
| 3-3 | Sn | 4 | 4 | 0 | 1 | S | S | $CH_2$ | — | — | — |
| 3-4 | Sn | 4 | 4 | 0 | 1 | O | S | $CH_2$ | — | — | — |
| 3-5 | Sn | 4 | 4 | 0 | 1 | S | O | $CH_2$ | — | — | — |
| 3-6 | Sn | 4 | 4 | 0 | 1 | O | O | $CH_2$ | — | — | — |
| 3-7 | Sn | 4 | 4 | 0 | 1 | S | S | $C_2H_4$ | — | — | — |
| 3-8 | Sn | 4 | 4 | 0 | 1 | O | S | $C_2H_4$ | — | — | — |
| 3-9 | Sn | 4 | 4 | 0 | 1 | S | O | $C_2H_4$ | — | — | — |
| 3-10 | Sn | 4 | 4 | 0 | 1 | O | O | $C_2H_4$ | — | — | — |
| 3-11 | Sn | 4 | 4 | 0 | 1 | S | S | 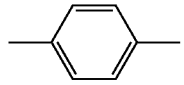 | — | — | — |
| 3-12 | Sn | 4 | 4 | 0 | 1 | O | S | 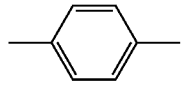 | — | — | — |
| 3-13 | Sn | 4 | 4 | 0 | 1 | S | O | 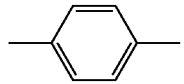 | — | — | — |

TABLE 3-1-continued
[Concrete examples of the compound represented by the general formula (3)]
| Compound Nos. | M | n | p | q | m | X1 | X2 | R1 | Y1 | Y2 | Y3 |
|---|---|---|---|---|---|---|---|---|---|---|---|
| 3-14 | Sn | 4 | 4 | 0 | 1 | O | O |  | — | — | — |
| 3-15 | Sn | 4 | 4 | 0 | 1 | S | S | 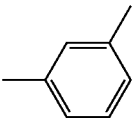 | — | — | — |
| 3-16 | Sn | 4 | 4 | 0 | 1 | O | S | 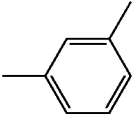 | — | — | — |
| 3-17 | Sn | 4 | 4 | 0 | 1 | S | O | 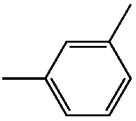 | — | — | — |
| 3-18 | Sn | 4 | 4 | 0 | 1 | O | O | 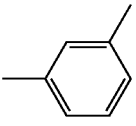 | — | — | — |
| 3-19 | Sn | 4 | 4 | 0 | 1 | S | S | 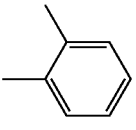 | — | — | — |
| 3-20 | Sn | 4 | 4 | 0 | 1 | O | S | 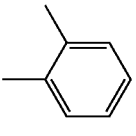 | — | — | — |
| 3-21 | Sn | 4 | 4 | 0 | 1 | S | O | 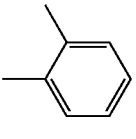 | — | — | — |
| 3-22 | Sn | 4 | 4 | 0 | 1 | O | O | 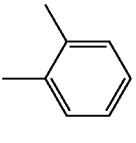 | — | — | — |
| 3-23 | Sn | 4 | 4 | 0 | 1 | S | S | 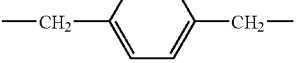 | — | — | — |
| 3-24 | Sn | 4 | 4 | 0 | 1 | O | S |  | — | — | — |
| 3-25 | Sn | 4 | 4 | 0 | 1 | S | O |  | — | — | — |

TABLE 3-1-continued
[Concrete examples of the compound represented by the general formula (3)]
| Compound Nos. | M | n | p | q | m | X1 | X2 | R1 | Y1 | Y2 | Y3 |
|---|---|---|---|---|---|---|---|---|---|---|---|
| 3-26 | Sn | 4 | 4 | 0 | 1 | O | O |  | — | — | — |
| 3-27 | Sn | 4 | 4 | 0 | 1 | S | S | 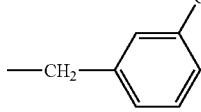 | — | — | — |
| 3-28 | Sn | 4 | 4 | 0 | 1 | O | S | 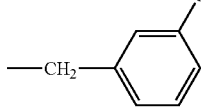 | — | — | — |
| 3-29 | Sn | 4 | 4 | 0 | 1 | S | O | 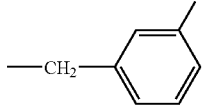 | — | — | — |
| 3-30 | Sn | 4 | 4 | 0 | 1 | O | O | 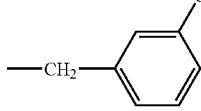 | — | — | — |
| 3-31 | Sn | 4 | 4 | 0 | 1 | S | S | 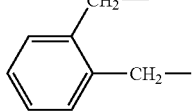 | — | — | — |
| 3-32 | Sn | 4 | 4 | 0 | 1 | O | S | 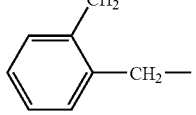 | — | — | — |
| 3-33 | Sn | 4 | 4 | 0 | 1 | S | O | 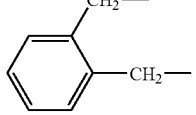 | — | — | — |
| 3-34 | Sn | 4 | 4 | 0 | 1 | O | O | 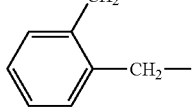 | — | — | — |
| 3-35 | Sn | 4 | 3 | 1 | 0 | S | — | — | $CH_3$ | — | — |
| 3-36 | Sn | 4 | 3 | 1 | 0 | O | — | — | $CH_3$ | — | — |
| 3-37 | Sn | 4 | 3 | 1 | 0 | S | — | — | $C_2H_5$ | — | — |
| 3-38 | Sn | 4 | 3 | 1 | 0 | O | — | — | $C_2H_5$ | — | — |
| 3-39 | Sn | 4 | 3 | 1 | 0 | S | — | — | $C_3H_7$ | — | — |
| 3-40 | Sn | 4 | 3 | 1 | 0 | O | — | — | $C_3H_7$ | — | — |
| 3-41 | Sn | 4 | 3 | 1 | 0 | S | — | — | $C_4H_9$ | — | — |
| 3-42 | Sn | 4 | 3 | 1 | 0 | O | — | — | $C_4H_9$ | — | — |
| 3-43 | Sn | 4 | 3 | 1 | 0 | S | — | — | $C_6H_5$ | — | — |
| 3-44 | Sn | 4 | 3 | 1 | 0 | O | — | — | $C_6H_5$ | — | — |
| 3-45 | Sn | 4 | 2 | 2 | 0 | S | — | — | $CH_3$ | $CH_3$ | — |
| 3-46 | Sn | 4 | 2 | 2 | 0 | O | — | — | $CH_3$ | $CH_3$ | — |
| 3-47 | Sn | 4 | 2 | 2 | 0 | S | — | — | $C_2H_5$ | $C_2H_5$ | — |

TABLE 3-1-continued

[Concrete examples of the compound represented by the general formula (3)]

| Compound Nos. | M | n | p | q | m | X1 | X2 | R1 | Y1 | Y2 | Y3 |
|---|---|---|---|---|---|---|---|---|---|---|---|
| 3-48 | Sn | 4 | 2 | 2 | 0 | O | — | — | $C_2H_5$ | $C_2H_5$ | — |
| 3-49 | Sn | 4 | 2 | 2 | 0 | S | — | — | $C_3H_7$ | $C_3H_7$ | — |
| 3-50 | Sn | 4 | 2 | 2 | 0 | O | — | — | $C_3H_7$ | $C_3H_7$ | — |

TABLE 3-2

[Concrete examples of the compound represented by the general formula (3)]

| Compound Nos. | M | n | p | q | m | X1 | X2 | R1 | Y1 | Y2 | Y3 |
|---|---|---|---|---|---|---|---|---|---|---|---|
| 3-51 | Sn | 4 | 2 | 2 | 0 | S | — | — | $C_4H_9$ | $C_4H_9$ | — |
| 3-52 | Sn | 4 | 2 | 2 | 0 | O | — | — | $C_4H_9$ | $C_4H_9$ | — |
| 3-53 | Sn | 4 | 2 | 2 | 0 | S | — | — | $C_6H_5$ | $C_6H_5$ | — |
| 3-54 | Sn | 4 | 2 | 2 | 0 | O | — | — | $C_6H_5$ | $C_6H_5$ | — |
| 3-55 | Sn | 4 | 1 | 3 | 0 | S | — | — | $CH_3$ | $CH_3$ | $CH_3$ |
| 3-56 | Sn | 4 | 1 | 3 | 0 | O | — | — | $CH_3$ | $CH_3$ | $CH_3$ |
| 3-57 | Sn | 4 | 1 | 3 | 0 | S | — | — | $C_2H_5$ | $C_2H_5$ | $C_2H_5$ |
| 3-58 | Sn | 4 | 1 | 3 | 0 | O | — | — | $C_2H_5$ | $C_2H_5$ | $C_2H_5$ |
| 3-59 | Sn | 4 | 1 | 3 | 0 | S | — | — | $C_3H_7$ | $C_3H_7$ | $C_3H_7$ |
| 3-60 | Sn | 4 | 1 | 3 | 0 | O | — | — | $C_3H_7$ | $C_3H_7$ | $C_3H_7$ |
| 3-61 | Sn | 4 | 1 | 3 | 0 | S | — | — | $C_4H_9$ | $C_4H_9$ | $C_4H_9$ |
| 3-62 | Sn | 4 | 1 | 3 | 0 | O | — | — | $C_4H_9$ | $C_4H_9$ | $C_4H_9$ |
| 3-63 | Sn | 4 | 1 | 3 | 0 | S | — | — | $C_6H_5$ | $C_6H_5$ | $C_6H_5$ |
| 3-64 | Sn | 4 | 1 | 3 | 0 | O | — | — | $C_6H_5$ | $C_6H_5$ | $C_6H_5$ |
| 3-65 | Sn | 4 | 3 | 1 | 0 | S | — | — | $SCH_3$ | — | — |
| 3-66 | Sn | 4 | 3 | 1 | 0 | O | — | — | $SCH_3$ | — | — |
| 3-67 | Sn | 4 | 3 | 1 | 0 | S | — | — | $SC_2H_5$ | — | — |
| 3-68 | Sn | 4 | 3 | 1 | 0 | O | — | — | $SC_2H_5$ | — | — |
| 3-69 | Sn | 4 | 3 | 1 | 0 | S | — | — | $SC_6H_5$ | — | — |
| 3-70 | Sn | 4 | 3 | 1 | 0 | O | — | — | $SC_6H_5$ | — | — |
| 3-71 | Sn | 4 | 2 | 2 | 0 | S | — | — | $SC_2H_4S$ | — | — |
| 3-72 | Sn | 4 | 2 | 2 | 0 | O | — | — | $SC_2H_4S$ | — | — |
| 3-73 | Sn | 4 | 2 | 2 | 0 | S | — | — | $SC_3H_6S$ | — | — |
| 3-74 | Sn | 4 | 2 | 2 | 0 | O | — | — | $SC_3H_6S$ | — | — |
| 3-75 | Sn | 4 | 2 | 2 | 0 | S | — | — | $SC_2H_4SC_2H_4S$ | — | — |
| 3-76 | Sn | 4 | 2 | 2 | 0 | O | — | — | $SC_2H_4SC_2H_4S$ | — | — |
| 3-77 | Sn | 4 | 3 | 1 | 1 | S | S | $CH_2$ | $CH_3$ | — | — |
| 3-78 | Sn | 4 | 3 | 1 | 1 | O | S | $CH_2$ | $CH_3$ | — | — |
| 3-79 | Sn | 4 | 3 | 1 | 1 | S | O | $CH_2$ | $CH_3$ | — | — |
| 3-80 | Sn | 4 | 3 | 1 | 1 | O | O | $CH_2$ | $CH_3$ | — | — |
| 3-81 | Sn | 4 | 3 | 1 | 1 | S | S | $C_2H_4$ | $CH_3$ | — | — |
| 3-82 | Sn | 4 | 3 | 1 | 1 | O | S | $C_2H_4$ | $CH_3$ | — | — |
| 3-83 | Sn | 4 | 3 | 1 | 1 | S | O | $C_2H_4$ | $CH_3$ | — | — |
| 3-84 | Sn | 4 | 3 | 1 | 1 | O | O | $C_2H_4$ | $CH_3$ | — | — |
| 3-85 | Sn | 4 | 3 | 1 | 1 | S | S | C6H4 (p-phenylene) | $CH_3$ | — | — |
| 3-86 | Sn | 4 | 3 | 1 | 1 | O | S | C6H4 (p-phenylene) | $CH_3$ | — | — |
| 3-87 | Sn | 4 | 3 | 1 | 1 | S | O | C6H4 (p-phenylene) | $CH_3$ | — | — |
| 3-88 | Sn | 4 | 3 | 1 | 1 | O | O | C6H4 (p-phenylene) | $CH_3$ | — | — |

TABLE 3-2-continued
[Concrete examples of the compound represented by the general formula (3)]
| Compound Nos. | M | n | p | q | m | X1 | X2 | R1 | Y1 | Y2 | Y3 |
|---|---|---|---|---|---|---|---|---|---|---|---|
| 3-89 | Sn | 4 | 3 | 1 | 1 | S | S | 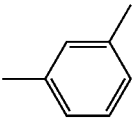 | CH₃ | — | — |
| 3-90 | Sn | 4 | 3 | 1 | 1 | O | S | 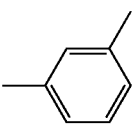 | CH₃ | — | — |
| 3-91 | Sn | 4 | 3 | 1 | 1 | S | O | 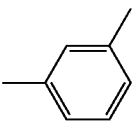 | CH₃ | — | — |
| 3-92 | Sn | 4 | 3 | 1 | 1 | O | O | 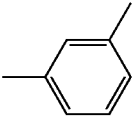 | CH₃ | — | — |
| 3-93 | Sn | 4 | 3 | 1 | 1 | S | S | 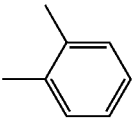 | CH₃ | — | — |
| 3-94 | Sn | 4 | 3 | 1 | 1 | O | S | 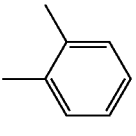 | CH₃ | — | — |
| 3-95 | Sn | 4 | 3 | 1 | 1 | S | O | 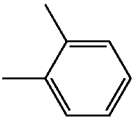 | CH₃ | — | — |
| 3-96 | Sn | 4 | 3 | 1 | 1 | O | O | 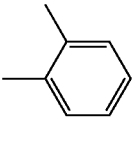 | CH₃ | — | — |
| 3-97 | Sn | 4 | 3 | 1 | 1 | S | S | 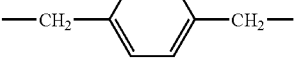 | CH₃ | — | — |
| 3-98 | Sn | 4 | 3 | 1 | 1 | O | S | 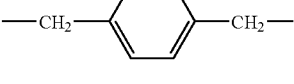 | CH₃ | — | — |
| 3-99 | Sn | 4 | 3 | 1 | 1 | S | O | 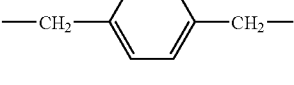 | CH₃ | — | — |
| 3-100 | Sn | 4 | 3 | 1 | 1 | O | O | 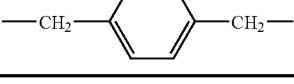 | CH₃ | — | — |

TABLE 3-3
[Concrete examples of the compound represented by the general formula (3)]
| Compound Nos. | M | n | p | q | m | X1 | X2 | R1 | Y1 | Y2 | Y3 |
|---|---|---|---|---|---|---|---|---|---|---|---|
| 3-101 | Sn | 4 | 3 | 1 | 1 | S | S | 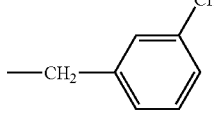 | CH$_3$ | — | — |
| 3-102 | Sn | 4 | 3 | 1 | 1 | O | S | 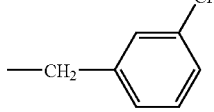 | CH$_3$ | — | — |
| 3-103 | Sn | 4 | 3 | 1 | 1 | S | O | 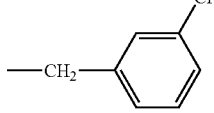 | CH$_3$ | — | — |
| 3-104 | Sn | 4 | 3 | 1 | 1 | O | O | 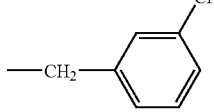 | CH$_3$ | — | — |
| 3-105 | Sn | 4 | 3 | 1 | 1 | S | S | 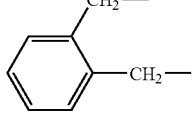 | CH$_3$ | — | — |
| 3-106 | Sn | 4 | 3 | 1 | 1 | O | S | 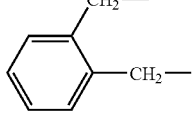 | CH$_3$ | — | — |
| 3-107 | Sn | 4 | 3 | 1 | 1 | S | O | 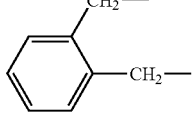 | CH$_3$ | — | — |
| 3-108 | Sn | 4 | 3 | 1 | 1 | O | O | 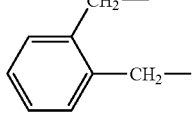 | CH$_3$ | — | — |
| 3-109 | Sn | 4 | 3 | 1 | 1 | S | S | CH$_2$ | C$_6$H$_5$ | — | — |
| 3-110 | Sn | 4 | 3 | 1 | 1 | O | S | CH$_2$ | C$_6$H$_5$ | — | — |
| 3-111 | Sn | 4 | 3 | 1 | 1 | S | O | CH$_2$ | C$_6$H$_5$ | — | — |
| 3-112 | Sn | 4 | 3 | 1 | 1 | O | O | CH$_2$ | C$_6$H$_5$ | — | — |
| 3-113 | Sn | 4 | 3 | 1 | 1 | S | S | C$_2$H$_4$ | C$_6$H$_5$ | — | — |
| 3-114 | Sn | 4 | 3 | 1 | 1 | O | S | C$_2$H$_4$ | C$_6$H$_5$ | — | — |
| 3-115 | Sn | 4 | 3 | 1 | 1 | S | O | C$_2$H$_4$ | C$_6$H$_5$ | — | — |
| 3-116 | Sn | 4 | 3 | 1 | 1 | O | O | C$_2$H$_4$ | C$_6$H$_5$ | — | — |
| 3-117 | Sn | 4 | 3 | 1 | 1 | S | S | 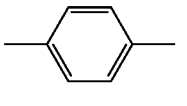 | C$_6$H$_5$ | — | — |
| 3-118 | Sn | 4 | 3 | 1 | 1 | O | S | 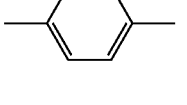 | C$_6$H$_5$ | — | — |

TABLE 3-3-continued
[Concrete examples of the compound represented by the general formula (3)]
| Compound Nos. | M | n | p | q | m | X1 | X2 | R1 | Y1 | Y2 | Y3 |
|---|---|---|---|---|---|---|---|---|---|---|---|
| 3-119 | Sn | 4 | 3 | 1 | 1 | S | O | 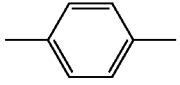 | $C_6H_5$ | — | — |
| 3-120 | Sn | 4 | 3 | 1 | 1 | O | O | 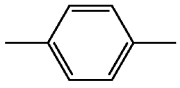 | $C_6H_5$ | — | — |
| 3-121 | Sn | 4 | 3 | 1 | 1 | S | S | 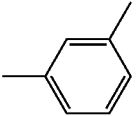 | $C_6H_5$ | — | — |
| 3-122 | Sn | 4 | 3 | 1 | 1 | O | S | 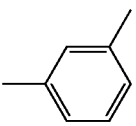 | $C_6H_5$ | — | — |
| 3-123 | Sn | 4 | 3 | 1 | 1 | S | O | 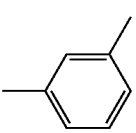 | $C_6H_5$ | — | — |
| 3-124 | Sn | 4 | 3 | 1 | 1 | O | O | 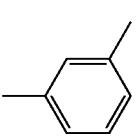 | $C_6H_5$ | — | — |
| 3-125 | Sn | 4 | 3 | 1 | 1 | S | S | 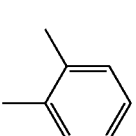 | $C_6H_5$ | — | — |
| 3-126 | Sn | 4 | 3 | 1 | 1 | O | S | 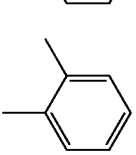 | $C_6H_5$ | — | — |
| 3-127 | Sn | 4 | 3 | 1 | 1 | S | O | 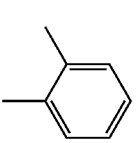 | $C_6H_5$ | — | — |
| 3-128 | Sn | 4 | 3 | 1 | 1 | O | O | 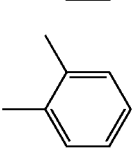 | $C_6H_5$ | — | — |
| 3-129 | Sn | 4 | 3 | 1 | 1 | S | S | 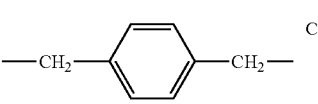 | $C_6H_5$ | — | — |
| 3-130 | Sn | 4 | 3 | 1 | 1 | O | S | 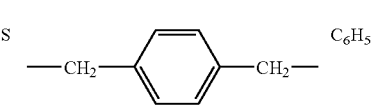 | $C_6H_5$ | — | — |

TABLE 3-3-continued
[Concrete examples of the compound represented by the general formula (3)]
| Compound Nos. | M | n | p | q | m | X1 | X2 | R1 | Y1 | Y2 | Y3 |
|---|---|---|---|---|---|---|---|---|---|---|---|
| 3-131 | Sn | 4 | 3 | 1 | 1 | S | O |  | $C_6H_5$ | — | — |
| 3-132 | Sn | 4 | 3 | 1 | 1 | O | O | 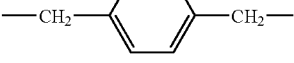 | $C_6H_5$ | — | — |
| 3-133 | Sn | 4 | 3 | 1 | 1 | S | S | 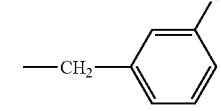 | $C_6H_5$ | — | — |
| 3-134 | Sn | 4 | 3 | 1 | 1 | O | S | 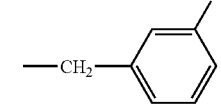 | $C_6H_5$ | — | — |
| 3-135 | Sn | 4 | 3 | 1 | 1 | S | O | 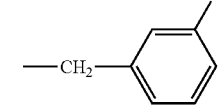 | $C_6H_5$ | — | — |
| 3-136 | Sn | 4 | 3 | 1 | 1 | O | O | 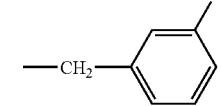 | $C_6H_5$ | — | — |
| 3-137 | Sn | 4 | 3 | 1 | 1 | S | S | 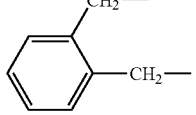 | $C_6H_5$ | — | — |
| 3-138 | Sn | 4 | 3 | 1 | 1 | O | S | 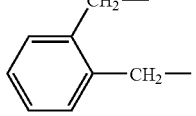 | $C_6H_5$ | — | — |
| 3-139 | Sn | 4 | 3 | 1 | 1 | S | O | 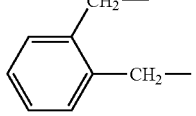 | $C_6H_5$ | — | — |
| 3-140 | Sn | 4 | 3 | 1 | 1 | O | O | 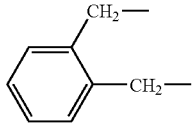 | $C_6H_5$ | — | — |
| 3-141 | Si | 4 | 4 | 0 | 0 | S | — | — | — | — | — |
| 3-142 | Si | 4 | 4 | 0 | 0 | O | — | — | — | — | — |
| 3-143 | Si | 4 | 4 | 0 | 1 | S | S | $CH_2$ | — | — | — |
| 3-144 | Si | 4 | 4 | 0 | 1 | O | S | $CH_2$ | — | — | — |
| 3-145 | Si | 4 | 4 | 0 | 1 | S | O | $CH_2$ | — | — | — |
| 3-146 | Si | 4 | 4 | 0 | 1 | O | O | $CH_2$ | — | — | — |

TABLE 3-4
[Concrete examples of the compound represented by the general formula (3)]
| Compound Nos. | M | n | p | q | m | X1 | X2 | R1 | Y1 | Y2 | Y3 |
|---|---|---|---|---|---|---|---|---|---|---|---|
| 3-147 | Si | 4 | 4 | 0 | 1 | S | S | $C_2H_4$ | — | — | — |
| 3-148 | Si | 4 | 4 | 0 | 1 | O | S | $C_2H_4$ | — | — | — |
| 3-149 | Si | 4 | 4 | 0 | 1 | S | O | $C_2H_4$ | — | — | — |
| 3-150 | Si | 4 | 4 | 0 | 1 | O | O | $C_2H_4$ | — | — | — |
| 3-151 | Si | 4 | 4 | 0 | 1 | S | S |  | — | — | — |
| 3-152 | Si | 4 | 4 | 0 | 1 | O | S |  | — | — | — |
| 3-153 | Si | 4 | 4 | 0 | 1 | S | O | 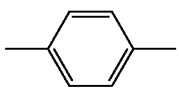 | — | — | — |
| 3-154 | Si | 4 | 4 | 0 | 1 | O | O | 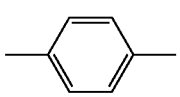 | — | — | — |
| 3-155 | Si | 4 | 4 | 0 | 1 | S | S | 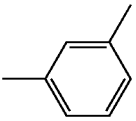 | — | — | — |
| 3-156 | Si | 4 | 4 | 0 | 1 | O | S | 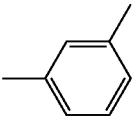 | — | — | — |
| 3-157 | Si | 4 | 4 | 0 | 1 | S | O | 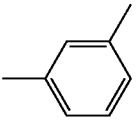 | — | — | — |
| 3-158 | Si | 4 | 4 | 0 | 1 | O | O | 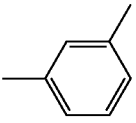 | — | — | — |
| 3-159 | Si | 4 | 4 | 0 | 1 | S | S | 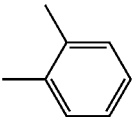 | — | — | — |
| 3-160 | Si | 4 | 4 | 0 | 1 | O | S | 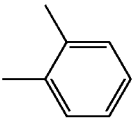 | — | — | — |
| 3-161 | Si | 4 | 4 | 0 | 1 | S | O | 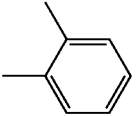 | — | — | — |

TABLE 3-4-continued
[Concrete examples of the compound represented by the general formula (3)]
| Compound Nos. | M | n | p | q | m | X1 | X2 | R1 | Y1 | Y2 | Y3 |
|---|---|---|---|---|---|---|---|---|---|---|---|
| 3-162 | Si | 4 | 4 | 0 | 1 | O | O | 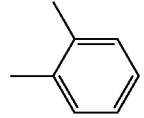 | — | — | — |
| 3-163 | Si | 4 | 4 | 0 | 1 | S | S | 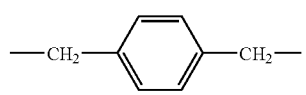 | — | — | — |
| 3-164 | Si | 4 | 4 | 0 | 1 | O | S | 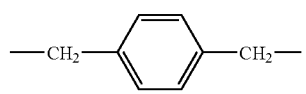 | — | — | — |
| 3-165 | Si | 4 | 4 | 0 | 1 | S | O | 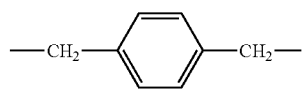 | — | — | — |
| 3-166 | Si | 4 | 4 | 0 | 1 | O | O | 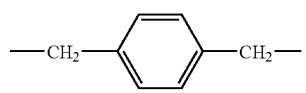 | — | — | — |
| 3-167 | Si | 4 | 4 | 0 | 1 | S | S | 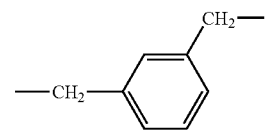 | — | — | — |
| 3-168 | Si | 4 | 4 | 0 | 1 | O | S | 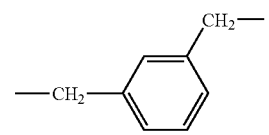 | — | — | — |
| 3-169 | Si | 4 | 4 | 0 | 1 | S | O | 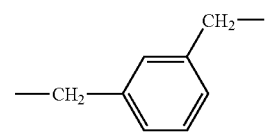 | — | — | — |
| 3-170 | Si | 4 | 4 | 0 | 1 | O | O | 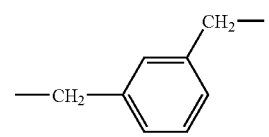 | — | — | — |
| 3-171 | Si | 4 | 4 | 0 | 1 | S | S | 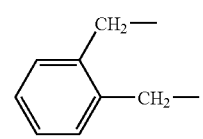 | — | — | — |
| 3-172 | Si | 4 | 4 | 0 | 1 | O | S | 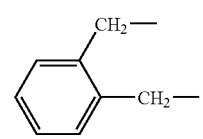 | — | — | — |
| 3-173 | Si | 4 | 4 | 0 | 1 | S | O | 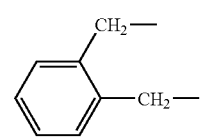 | — | — | — |

TABLE 3-4-continued

[Concrete examples of the compound represented by the general formula (3)]

| Compound Nos. | M | n | p | q | m | X1 | X2 | R1 | Y1 | Y2 | Y3 |
|---|---|---|---|---|---|---|---|---|---|---|---|
| 3-174 | Si | 4 | 4 | 0 | 1 | O | O | 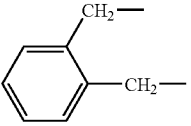 | — | — | — |
| 3-175 | Si | 4 | 3 | 1 | 0 | S | — | — | $CH_3$ | — | — |
| 3-176 | Si | 4 | 3 | 1 | 0 | O | — | — | $CH_3$ | — | — |
| 3-177 | Si | 4 | 3 | 1 | 0 | S | — | — | $C_2H_5$ | — | — |
| 3-178 | Si | 4 | 3 | 1 | 0 | O | — | — | $C_2H_5$ | — | — |
| 3-179 | Si | 4 | 3 | 1 | 0 | S | — | — | $C_6H_5$ | — | — |
| 3-180 | Si | 4 | 3 | 1 | 0 | O | — | — | $C_6H_5$ | — | — |
| 3-181 | Si | 4 | 2 | 2 | 0 | S | — | — | $CH_3$ | $CH_3$ | — |
| 3-182 | Si | 4 | 2 | 2 | 0 | O | — | — | $CH_3$ | $CH_3$ | — |
| 3-183 | Si | 4 | 2 | 2 | 0 | S | — | — | $C_6H_5$ | $C_6H_5$ | — |
| 3-184 | Si | 4 | 2 | 2 | 0 | O | — | — | $C_6H_5$ | $C_6H_5$ | — |
| 3-185 | Si | 4 | 1 | 3 | 0 | S | — | — | $C_6H_5$ | $C_6H_5$ | $C_6H_5$ |
| 3-186 | Si | 4 | 1 | 3 | 0 | O | — | — | $C_6H_5$ | $C_6H_5$ | $C_6H_5$ |
| 3-187 | Si | 4 | 2 | 2 | 0 | S | — | — | $SC_2H_4S$ | — | — |
| 3-188 | Si | 4 | 2 | 2 | 0 | O | — | — | $SC_2H_4S$ | — | — |
| 3-189 | Si | 4 | 2 | 2 | 0 | S | — | — | $SC_3H_6S$ | — | — |
| 3-190 | Si | 4 | 2 | 2 | 0 | O | — | — | $SC_3H_6S$ | — | — |
| 3-191 | Si | 4 | 2 | 2 | 0 | S | — | — | $SC_2H_4SC_2H_4S$ | — | — |
| 3-192 | Si | 4 | 2 | 2 | 0 | O | — | — | $SC_2H_4SC_2H_4S$ | — | — |
| 3-193 | Ge | 4 | 4 | 0 | 0 | S | — | — | — | — | — |
| 3-194 | Ge | 4 | 4 | 0 | 0 | O | — | — | — | — | — |
| 3-195 | Ge | 4 | 4 | 0 | 1 | S | S | $CH_2$ | — | — | — |
| 3-196 | Ge | 4 | 4 | 0 | 1 | O | S | $CH_2$ | — | — | — |
| 3-197 | Ge | 4 | 4 | 0 | 1 | S | O | $CH_2$ | — | — | — |
| 3-198 | Ge | 4 | 4 | 0 | 1 | O | O | $CH_2$ | — | — | — |
| 3-199 | Ge | 4 | 4 | 0 | 1 | S | S | $C_2H_4$ | — | — | — |
| 3-200 | Ge | 4 | 4 | 0 | 1 | O | S | $C_2H_4$ | — | — | — |

TABLE 3-5

[Concrete examples of the compound represented by the general formula (3)]

| Compound Nos. | M | n | p | q | m | X1 | X2 | R1 | Y1 | Y2 | Y3 |
|---|---|---|---|---|---|---|---|---|---|---|---|
| 3-201 | Ge | 4 | 4 | 0 | 1 | S | O | $C_2H_4$ | — | — | — |
| 3-202 | Ge | 4 | 4 | 0 | 1 | O | O | $C_2H_4$ | — | — | — |
| 3-203 | Ge | 4 | 4 | 0 | 1 | S | S | 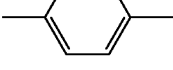 | — | — | — |
| 3-204 | Ge | 4 | 4 | 0 | 1 | O | S |  | — | — | — |
| 3-205 | Ge | 4 | 4 | 0 | 1 | S | O |  | — | — | — |
| 3-206 | Ge | 4 | 4 | 0 | 1 | O | O | 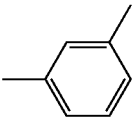 | — | — | — |
| 3-207 | Ge | 4 | 4 | 0 | 1 | S | S |  | — | — | — |

TABLE 3-5-continued

[Concrete examples of the compound represented by the general formula (3)]

| Compound Nos. | M | n | p | q | m | X1 | X2 | R1 | Y1 | Y2 | Y3 |
|---|---|---|---|---|---|---|---|---|---|---|---|
| 3-208 | Ge | 4 | 4 | 0 | 1 | O | S | 3-methylbenzene (meta) | — | — | — |
| 3-209 | Ge | 4 | 4 | 0 | 1 | S | O | 3-methylbenzene (meta) | — | — | — |
| 3-210 | Ge | 4 | 4 | 0 | 1 | O | O | 3-methylbenzene (meta) | — | — | — |
| 3-211 | Ge | 4 | 4 | 0 | 1 | S | S | 2-methylbenzene (ortho) | — | — | — |
| 3-212 | Ge | 4 | 4 | 0 | 1 | O | S | 2-methylbenzene (ortho) | — | — | — |
| 3-213 | Ge | 4 | 4 | 0 | 1 | S | O | 2-methylbenzene (ortho) | — | — | — |
| 3-214 | Ge | 4 | 4 | 0 | 1 | O | O | 2-methylbenzene (ortho) | — | — | — |
| 3-215 | Ge | 4 | 4 | 0 | 1 | S | S | —CH$_2$—C$_6$H$_4$—CH$_2$— (para) | — | — | — |
| 3-216 | Ge | 4 | 4 | 0 | 1 | O | S | —CH$_2$—C$_6$H$_4$—CH$_2$— (para) | — | — | — |
| 3-217 | Ge | 4 | 4 | 0 | 1 | S | O | —CH$_2$—C$_6$H$_4$—CH$_2$— (para) | — | — | — |
| 3-218 | Ge | 4 | 4 | 0 | 1 | O | O | —CH$_2$—C$_6$H$_4$—CH$_2$— (para) | — | — | — |
| 3-219 | Ge | 4 | 4 | 0 | 1 | S | S | —CH$_2$—C$_6$H$_4$—CH$_2$— (meta) | — | — | — |

TABLE 3-5-continued

[Concrete examples of the compound represented by the general formula (3)]

| Compound Nos. | M | n | p | q | m | X1 | X2 | R1 | Y1 | Y2 | Y3 |
|---|---|---|---|---|---|---|---|---|---|---|---|
| 3-220 | Ge | 4 | 4 | 0 | 1 | O | S | 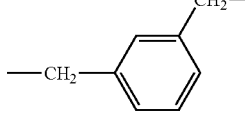 | — | — | — |
| 3-221 | Ge | 4 | 4 | 0 | 1 | S | O | 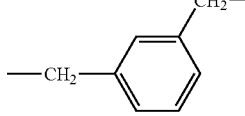 | — | — | — |
| 3-222 | Ge | 4 | 4 | 0 | 1 | O | O | 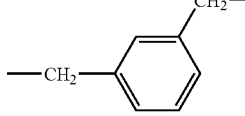 | — | — | — |
| 3-223 | Ge | 4 | 4 | 0 | 1 | S | S | 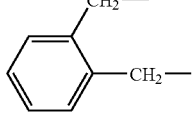 | — | — | — |
| 3-224 | Ge | 4 | 4 | 0 | 1 | O | S | 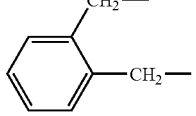 | — | — | — |
| 3-225 | Ge | 4 | 4 | 0 | 1 | S | O | 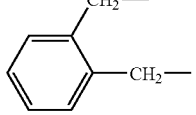 | — | — | — |
| 3-226 | Ge | 4 | 4 | 0 | 1 | O | O | 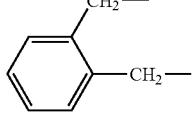 | — | — | — |
| 3-227 | Ge | 4 | 3 | 1 | 0 | S | — | $CH_3$ | — | — | — |
| 3-228 | Ge | 4 | 3 | 1 | 0 | O | — | $CH_3$ | — | — | — |
| 3-229 | Ge | 4 | 3 | 1 | 0 | S | — | $C_2H_5$ | — | — | — |
| 3-230 | Ge | 4 | 3 | 1 | 0 | O | — | $C_2H_5$ | — | — | — |
| 3-231 | Ge | 4 | 3 | 1 | 0 | S | — | $C_6H_5$ | — | — | — |
| 3-232 | Ge | 4 | 3 | 1 | 0 | O | — | $C_6H_5$ | — | — | — |
| 3-233 | Ge | 4 | 2 | 2 | 0 | S | — | $CH_3$ | $CH_3$ | — | — |
| 3-234 | Ge | 4 | 2 | 2 | 0 | O | — | $CH_3$ | $CH_3$ | — | — |
| 3-235 | Ge | 4 | 2 | 2 | 0 | S | — | $C_6H_5$ | $C_6H_5$ | — | — |
| 3-236 | Ge | 4 | 2 | 2 | 0 | O | — | $C_6H_5$ | $C_6H_5$ | — | — |
| 3-237 | Ge | 4 | 1 | 3 | 0 | S | — | $C_6H_5$ | $C_6H_5$ | $C_6H_5$ | — |
| 3-238 | Ge | 4 | 1 | 3 | 0 | O | — | $C_6H_5$ | $C_6H_5$ | $C_6H_5$ | — |
| 3-239 | Ge | 4 | 2 | 2 | 0 | S | — | $SC_2H_4S$ | — | — | — |
| 3-240 | Ge | 4 | 2 | 2 | 0 | O | — | $SC_2H_4S$ | — | — | — |
| 3-241 | Ge | 4 | 2 | 2 | 0 | S | — | $SC_3H_6S$ | — | — | — |
| 3-242 | Ge | 4 | 2 | 2 | 0 | O | — | $SC_3H_6S$ | — | — | — |
| 3-243 | Ge | 4 | 2 | 2 | 0 | S | — | $SC_2H_4SO_2H_4S$ | — | — | — |
| 3-244 | Ge | 4 | 2 | 2 | 0 | O | — | $SC_2H_4SO_2H_4S$ | — | — | — |
| 3-245 | Zn | 2 | 2 | 0 | 0 | S | — | — | — | — | — |
| 3-246 | Zn | 2 | 2 | 0 | 0 | O | — | — | — | — | — |
| 3-247 | Zr | 4 | 4 | 0 | 0 | S | — | — | — | — | — |
| 3-248 | Zr | 4 | 4 | 0 | 0 | O | — | — | — | — | — |
| 3-249 | Zr | 4 | 2 | 2 | 0 | S | — | — | cyclopentadienyl | cyclopentadienyl | — |
| 3-250 | Zr | 4 | 2 | 2 | 0 | O | — | — | cyclopentadienyl | cyclopentadienyl | — |

TABLE 3-6

[Concrete examples of the compound represented by the general formula (3)]

| Compound Nos. | M | n | p | q | m | X1 | X2 | R1 | Y1 | Y2 | Y3 |
|---|---|---|---|---|---|---|---|---|---|---|---|
| 3-251 | Zr | 4 | 4 | 0 | 1 | S | S | CH$_2$ | — | — | — |
| 3-252 | Zr | 4 | 4 | 0 | 1 | O | S | CH$_2$ | — | — | — |
| 3-253 | Zr | 4 | 4 | 0 | 1 | S | O | CH$_2$ | — | — | — |
| 3-254 | Zr | 4 | 4 | 0 | 1 | O | O | CH$_2$ | — | — | — |
| 3-255 | Zr | 4 | 4 | 0 | 1 | S | S | C$_2$H$_4$ | — | — | — |
| 3-256 | Zr | 4 | 4 | 0 | 1 | O | S | C$_2$H$_4$ | — | — | — |
| 3-257 | Zr | 4 | 4 | 0 | 1 | S | O | C$_2$H$_4$ | — | — | — |
| 3-258 | Zr | 4 | 4 | 0 | 1 | O | O | C$_2$H$_4$ | — | — | — |
| 3-259 | Zr | 4 | 2 | 2 | 1 | S | S | CH$_2$ | cyclopentadienyl | cyclopentadienyl | — |
| 3-260 | Zr | 4 | 2 | 2 | 1 | O | S | CH$_2$ | cyclopentadienyl | cyclopentadienyl | — |
| 3-261 | Zr | 4 | 2 | 2 | 1 | S | O | CH$_2$ | cyclopentadienyl | cyclopentadienyl | — |
| 3-262 | Zr | 4 | 2 | 2 | 1 | O | O | CH$_2$ | cyclopentadienyl | cyclopentadienyl | — |
| 3-263 | Zr | 4 | 2 | 2 | 1 | S | S | C$_2$H$_4$ | cyclopentadienyl | cyclopentadienyl | — |
| 3-264 | Zr | 4 | 2 | 2 | 1 | O | S | C$_2$H$_4$ | cyclopentadienyl | cyclopentadienyl | — |
| 3-265 | Zr | 4 | 2 | 2 | 1 | S | O | C$_2$H$_4$ | cyclopentadienyl | cyclopentadienyl | — |
| 3-266 | Zr | 4 | 2 | 2 | 1 | O | O | C$_2$H$_4$ | cyclopentadienyl | cyclopentadienyl | — |
| 3-267 | Ti | 4 | 4 | 0 | 0 | S | — | — | — | — | — |
| 3-268 | Ti | 4 | 4 | 0 | 0 | O | — | — | — | — | — |
| 3-269 | Ti | 4 | 2 | 2 | 0 | S | — | — | cyclopentadienyl | cyclopentadienyl | — |
| 3-270 | Ti | 4 | 2 | 2 | 0 | O | — | — | cyclopentadienyl | cyclopentadienyl | — |
| 3-271 | Ti | 4 | 4 | 0 | 1 | S | S | CH$_2$ | — | — | — |
| 3-272 | Ti | 4 | 4 | 0 | 1 | O | S | CH$_2$ | — | — | — |
| 3-273 | Ti | 4 | 4 | 0 | 1 | S | O | CH$_2$ | — | — | — |
| 3-274 | Ti | 4 | 4 | 0 | 1 | O | O | CH$_2$ | — | — | — |
| 3-275 | Ti | 4 | 4 | 0 | 1 | S | S | C$_2$H$_4$ | — | — | — |
| 3-276 | Ti | 4 | 4 | 0 | 1 | O | S | C$_2$H$_4$ | — | — | — |
| 3-277 | Ti | 4 | 4 | 0 | 1 | S | O | C$_2$H$_4$ | — | — | — |
| 3-278 | Ti | 4 | 4 | 0 | 1 | O | O | C$_2$H$_4$ | — | — | — |
| 3-279 | Ti | 4 | 2 | 2 | 1 | S | S | CH$_2$ | cyclopentadienyl | cyclopentadienyl | — |
| 3-280 | Ti | 4 | 2 | 2 | 1 | O | S | CH$_2$ | cyclopentadienyl | cyclopentadienyl | — |
| 3-281 | Ti | 4 | 2 | 2 | 1 | S | O | CH$_2$ | cyclopentadienyl | cyclopentadienyl | — |
| 3-282 | Ti | 4 | 2 | 2 | 1 | O | O | CH$_2$ | cyclopentadienyl | cyclopentadienyl | — |
| 3-283 | Ti | 4 | 2 | 2 | 1 | S | S | C$_2$H$_4$ | cyclopentadienyl | cyclopentadienyl | — |
| 3-284 | Ti | 4 | 2 | 2 | 1 | O | S | C$_2$H$_4$ | cyclopentadienyl | cyclopentadienyl | — |
| 3-285 | Ti | 4 | 2 | 2 | 1 | S | O | C$_2$H$_4$ | cyclopentadienyl | cyclopentadienyl | — |
| 3-286 | Ti | 4 | 2 | 2 | 1 | O | O | C$_2$H$_4$ | cyclopentadienyl | cyclopentadienyl | — |
| 3-287 | Pb | 4 | 4 | 0 | 0 | S | — | — | — | — | — |
| 3-288 | Pb | 4 | 4 | 0 | 0 | O | — | — | — | — | — |
| 3-289 | Al | 3 | 3 | 0 | 0 | S | — | — | — | — | — |
| 3-290 | Al | 3 | 3 | 0 | 0 | O | — | — | — | — | — |
| 3-291 | Al | 3 | 2 | 1 | 0 | S | — | — | SCH$_3$ | — | — |
| 3-292 | Al | 3 | 2 | 1 | 0 | O | — | — | SCH$_3$ | — | — |
| 3-293 | Al | 3 | 2 | 1 | 0 | S | — | — | SC$_2$H$_5$ | — | — |
| 3-294 | Al | 3 | 2 | 1 | 0 | O | — | — | SC$_2$H$_5$ | — | — |
| 3-295 | Al | 3 | 2 | 1 | 0 | S | — | — | SC$_6$H$_5$ | — | — |
| 3-296 | Al | 3 | 2 | 1 | 0 | O | — | — | SC$_6$H$_5$ | — | — |
| 3-297 | Al | 3 | 1 | 2 | 0 | S | — | — | — | SC$_2$H$_4$S | — |
| 3-298 | Al | 3 | 1 | 2 | 0 | O | — | — | — | SC$_2$H$_4$S | — |
| 3-299 | Al | 3 | 1 | 2 | 0 | S | — | — | SC$_2$H$_4$SC$_2$H$_4$S | — | — |
| 3-300 | Al | 3 | 1 | 2 | 0 | O | — | — | SC$_2$H$_4$SC$_2$H$_4$S | — | — |

The compound represented by the general formula (3) of the present invention is typically prepared by the reaction of a halide of the metal atom M represented by the general formula (5) with a hydroxy compound or a thiol compound having the thietane group represented by the general formula (6),

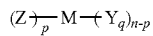 (5)

wherein, in the formula, M, n, p and Yq are the same as M, n, p and Yq in the general formula (3); and Z represents a halogen atom,

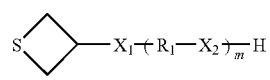 (6)

wherein, in the formula, $X_1$, $X_2$, $R_1$ and m are the same as $X_1$, $X_2$, $R_1$ and m in the general formula (3).

The compound represented by the general formula (5) is available as an industrial raw material or a research reagent. The compound represented by the general formula (6) is known in the art, and is prepared by a method as described, for example, in Japanese Patent Laid-Open No. 2003-327583.

The reaction can be carried out without a solvent or in the presence of a solvent, which is inactive to the reaction.

The solvents are not particularly limited as long as they are inactive to the reaction. Examples thereof include hydrocarbon solvents such as petroleum ether, hexane, benzene, toluene, xylene, mesitylene and the like; ether solvents such as diethyl ether, tetrahydrofuran, diethylene glycol dimethyl ether and the like; ketone solvents such as acetone, methyl ethyl ketone, methyl isobutyl ketone and the like; ester solvents such as ethyl acetate, butyl acetate, amyl acetate and the like; chlorine-containing solvents such as methylene chloride, chloroform, chlorobenzene, dichlorobenzene and the like; polar aprotic solvents such as N,N-dimethylformamide, N,N-dimethylacetamide, N,N-dimethylimidazolidinone, dimethyl sulfoxide and the like; water and the like.

The reaction temperature is not particularly limited, but it is usually in the range of from −78° C. to 200° C. and preferably from −78° C. to 100° C.

The reaction temperature affects the reaction time, but it is usually from several minutes to 100 hours.

The amount of the compound represented by the general formula (5) and the compound represented by the general formula (6) used in the reaction is not particularly limited, but the amount of the compound represented by the general formula (6) is usually from 0.01 to 100 mole, preferably from 0.1 to 50 mole and more preferably from 0.5 to 20 mole, based on 1 mole of the halogen atom contained in the compound represented by the general formula (5).

When carrying out the reaction, it is preferable to use a basic compound as a capturing agent of the generated halogenated hydrogen for effectively carrying out the reaction. Examples of the basic compound include inorganic bases such as sodium hydroxide, potassium hydroxide, lithium hydroxide, sodium carbonate, potassium carbonate, lithium carbonate, sodium bicarbonate, potassium bicarbonate, lithium bicarbonate, magnesium hydroxide, calcium hydroxide and the like; and organic bases such as pyridine, triethylamine, dimethylaniline, diethylaniline, 1,8-diazabicyclo[5,4,0]-7-undecene and the like.

The polymerizable composition of the present invention comprises the compound containing one or two or more thietane groups and a metal atom in a molecule such as the compound typically represented by the general formula (3) (hereinafter referred to as a metal-containing thietane compound) as a polymerizable compound, and comprises a polymerization catalyst as needed.

In this case, as the metal-containing thietane compound, the compounds as described above may be used singly or as the metal-containing thietane compound, a plurality of other compounds may, of course, be used together.

The content of the metal-containing thietane compound occupied in the total weight of the polymerizable compound contained in the polymerizable composition of the present invention is not particularly limited, but it is usually not less than 10 weight %, preferably not less than 30 weight %, more preferably not less than 50 weight % and further preferably not less than 70 weight %.

The polymerization catalyst to be used in the polymerizable composition of the present invention as needed is not particularly limited, and polymerization catalysts, known in the art as described, for example, in Japanese Patent Laid-Open No. 2003-327583 can be used. Examples of the polymerization catalyst include an amine compound, a phosphine compound, an organic acid and its derivatives (salt, ester or acid anhydride and the like), an inorganic acid, onium salt compounds such as a quaternary ammonium salt compound, a quaternary phosphonium salt compound, a tertiary sulfonium salt compound, a secondary iodonium salt compound and the like, a Lewis acid compound, a radical polymerization catalyst, a cationic polymerization catalyst and the like.

The amount of the polymerization catalyst used is affected by the composition of the polymerizable composition, polymerization conditions and the like, so it is not particularly limited. It is from 0.0001 to 10 weight parts, preferably from 0.001 to 5 weight parts, and more preferably from 0.005 to 3 weight parts, based on 100 weight of the total polymerizable compound contained in the polymerizable composition.

The polymerizable composition of the present invention may contain other polymerizable compounds in addition to the metal-containing thietane compound in the ranges in which the desired effect of the present invention is not damaged.

Examples of the polymerizable compound include various polymerizable monomers or polymerizable oligomers, known in the art. Examples thereof include a (meth)acrylic acid ester compound, a vinyl compound, an epoxy compound, an episulfide compounds, an oxetane compound, a thietane compound and the like.

The amount of the other polymerizable compounds occupied in the total weight of the polymerizable compounds contained in the polymerizable composition of the present invention is not particularly limited, but it is usually not more than 90 weight %, preferably not more than 70 weight %, more preferably not more than 50 weight %, and further preferably not more than 30 weight %

A typical process for producing the polymerizable composition of the present invention comprises using the metal-containing thietane compound and various known polymerizable compounds as described above depending on the intended use together, adding the aforementioned polymerization catalyst as further needed, and then mixing and dissolving the resulting mixture. The polymerizable composition is preferably polymerized after thoroughly degassing under a reduced pressure as required, and filtering off impurities, foreign substances or the like before polymerization.

When producing the polymerizable composition, various known additives can also be added in the ranges in which the effect of the present invention is not damaged. Examples of the additive include an internal release agent, a photostabilizer, an ultraviolet absorbent, an anti-oxidant, coloring pigments (for example, cyanine green, cyanine blue and the like), dyes, a flowability regulator, filler and the like.

The resin and the optical component comprising such a resin of the present invention are obtained by polymerization of the aforementioned polymerizable composition. Such polymerization is suitably carried out according to various methods, known in the art, used when producing plastic lenses. A typical method includes a casting polymerization.

Namely, the polymerizable composition of the present invention produced by the above method is degassed under a reduced pressure or filtered off as required, and then the polymerizable composition is poured into a mold, and heated as required for carrying out polymerization. In this case, it is preferable to carry out polymerization by slowly heating from a low temperature to a high temperature.

The mold is composed of, for example, two pieces of mirror surface-ground molds via a gasket made of polyethylene, an ethylene vinyl acetate copolymer, polyvinyl chloride and the like. Typical examples of the mold include, though not restricted to, combined molds such as glass and glass, glass and plastic plate, glass and metal plate, and the like. The mold may comprise two pieces of molds fixed by a tape such as a polyester adhesive tape or the like. In addition, a known method such as the mold release process may be performed for the mold, as needed.

When carrying out casting polymerization, the polymerization temperature is affected by the polymerization conditions such as the kind of polymerization initiator and the like, and is not particularly limited. But, it is usually from −50° C. to 200° C., preferably from −20° C. to 170° C., and more preferably from 0 to 150° C.

The polymerization temperature affects the polymerization time, but it is usually from 0.01 to 200 hours and preferably from 0.05 to 100 hours. Polymerization can also be carried out in combination of several temperatures by conducting low temperature, temperature elevation, temperature dropping and the like as required.

Furthermore, the polymerizable composition of the present invention can be polymerized by applying the active energy line such as an electron beam, ultraviolet light, visible light or the like. At this time, a radical polymerization catalyst or a cationic polymerization catalyst for initiating polymerization by the active energy line is used as required.

After the thus-obtained optical lens is cured, it may be subjected to an annealing process as required. Furthermore, for purposes of anti-reflection, high hardness grant, wear resistance improvement, anti-fogging property grant or fashionability grant, various known physical or chemical processes such as surface polishing, antistatic process, hard coat process, non-reflective coat process, anti-reflective process, tinting process, photochromic process (for example, photochromic lens process and the like) and the like may be performed as needed.

Meanwhile, the resin cured product and optical component obtained by polymerization of the polymerizable composition of the present invention have high transparency, good heat resistance and mechanical strength, while attaining a high refractive index (nd) exceeding 1.7.

Examples of the optical component of the present invention include various plastic lenses such as a spectacle lens for vision correction, a lens for cameras, a fresnel lens for liquid crystal projectors, a lenticular lens, a contact lens and the like, a sealing material for light emitting diodes, an optical waveguide, an optical adhesive used for the junction of an optical lens or an optical waveguide, an anti-reflection film to be used for optical lenses, transparent coating or transparent substrate used for liquid crystal display members (substrate, light guiding plate, film, sheet and the like) and the like.

EXAMPLES

The present invention is now more specifically illustrated below with reference to Preparation Examples and Examples. However, the present invention is not limited to these Examples.

Reference Preparation Example 1

According to the method as described in Japanese Patent Laid-Open No. 2003-327583, 3-thiethanol was synthesized. The resulting 3-thiethanol was used to synthesize 3-mercaptothietane. Namely, 190 g of thiourea, 253 g of a 35% hydrochloric acid solution and 250 g of water were introduced into a reactor equipped with a stirrer and a thermometer, and stirred. While stirring, 156 g of 3-thiethanol was added dropwise to the reaction solution over 1 hour. The resulting solution was stirred and reacted at 30° C. for 24 hours, and then 177 g of 24% ammonia water was added dropwise thereto over 1 hour. The solution was further reacted at 30° C. for 15 hours, and then allowed to stand for taking out an organic layer (lower layer) to obtain 134 g of a coarse composition. The resulting coarse composition was distilled off under a reduced pressure to collect a fraction with a boiling point of 40° C./106 Pa to obtain the desired product of a colorless transparent liquid, i.e., 3-mercaptothietane.

Example 1

Preparation of a Compound Represented by the Compound No. 3-1 in Table 3-1

11.04 g (0.104 mole) of 3-mercaptothietane was introduced to 150 g of dried methylene chloride and cooled down to −30° C. 11.87 g (0.15 mole) of dried pyridine was added thereto at the same temperature and stirred for 5 minutes. Subsequently, 25 ml (corresponding to 0.025 mole of tin tetrachloride) of a 1N methylene chloride solution of tin tetrachloride was inserted dropwise thereto at −30° C. over 2 hours. After the dropwise addition was completed, the reaction solution was subjected to a temperature elevation to −20° C. and further stirred at the temperature for 4 hours. 50 ml of 2N HCl was added to the reaction mixture, and the organic layer and the water layer were separated. The water layer was extracted twice using 30 ml of toluene and toluene was added to the organic layer. The organic layer with toluene added thereto was washed with 50 ml of 2N HCl and 50 ml of pure water twice respectively, and then dried over anhydrous magnesium sulfate. Methylene chloride and toluene were distilled off from the extract to obtain a coarse composition. The resulting coarse composition was purified by silica gel column chromatography with a development solvent of hexane to obtain 10.10 g (Yield: 75%) of a compound represented by the Compound No. 3-1 in Table 3-1. $^1$H-NMR data are shown in the following (solvent: $CDCl_3$, internal standard substance: TMS): δ 3.43 (16H), δ 4.70 (4H).

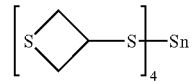

(Compound No. 3-1)

Example 2

Preparation of a Compound Represented by the Compound No. 3-1 in Table 3-1 (Another Method)

11.15 g (0.105 mole) of 3-mercaptothietane was introduced to 50 g of pure water. Subsequently, 41.2 g (0.103 mole) of a 10% NaOH aqueous solution was introduced dropwise at room temperature over 40 minutes. Then, the reaction solution was subjected to a temperature elevation to 30° C. and 65.2 g (corresponding to 0.025 mole of tin tetrachloride) of an aqueous solution of 10% tin tetrachloride was inserted dropwise at the same temperature over 4 hours. After the dropwise addition was completed, the solution was further stirred at the same temperature for 2 hours. 100 ml of chloroform was added to the reaction mixture, and the organic layer and the water layer were separated. The organic layer was washed with 100 ml of pure water twice, and then dried over anhydrous sodium sulfate. The solvent was distilled off from the extract to obtain 13.40 g (Yield: 99%) of a compound represented by the Compound No. 3-1 in Table 3-1.

Example 3

Preparation of a Compound Represented by the Compound No. 3-35 in Table 3-1

6.69 g (0.063 mole) of 3-mercaptothietane was introduced to 30 g of pure water. Subsequently, 24.8 g (0.062 mole) of a 10% NaOH aqueous solution was introduced dropwise at room temperature over 40 minutes. Then, the reaction solution was subjected to a temperature elevation to 30° C. and 48.0 g (corresponding to 0.020 mole of methyl tin trichloride) of an aqueous solution of 10% methyl tin trichloride was inserted dropwise at the same temperature over 4 hours. After the dropwise addition was completed, the solution was further stirred at the same temperature for 2 hours. 100 ml of chloroform was added to the reaction mixture, and the organic layer and the water layer were separated. The organic layer was washed with 100 ml of pure water twice, and then dried over anhydrous sodium sulfate. The solvent was distilled off from the extract to obtain 8.90 g (Yield: 99%) of a compound represented by the Compound No. 3-35 in Table 3-1. $^1$H-NMR data are shown in the following (solvent: CDCl$_3$, internal standard substance: TMS): δ 1.12 (3H), δ 3.38 (6H), δ 3.46 (6H), δ 4.62 (3H).

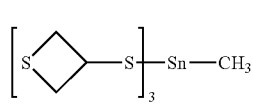

(Compound No. 3-35)

Example 4

Preparation of a Compound Represented by the Compound No. 3-41 in Table 3-1

9.80 g (Yield: 100%) of a compound represented by the Compound No. 3-41 in Table 3-1 was obtained by carrying out the same operation as in Example 3, except that butyl tin trichloride was used instead of methyl tin trichloride. $^1$H-NMR data are shown in the following (solvent: CDCl$_3$, internal standard substance: TMS): δ 0.93 (3H), δ 1.39 (2H), δ 1.75 (4H), δ 3.39 (12H), δ 4.64 (3H).

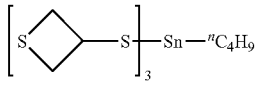

(Compound No. 3-41)

Example 5

Preparation of a Compound Represented by the Compound No. 3-43 in Table 3-1

8.28 g (Yield: 81%) of a compound represented by the Compound No. 3-43 in Table 3-1 was obtained by carrying out the same operation as in Example 3, except that phenyl tin trichloride was used instead of methyl tin trichloride. $^1$H-NMR data are shown in the following (solvent: DMSO-d6, internal standard substance: TMS): δ 3.14 (6H), δ 3.34 (6H), δ 4.55 (3H), δ 7.48 (3H), δ 7.60 (2H).

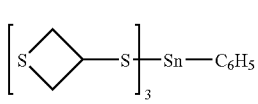

(Compound No. 3-43)

Example 6

Preparation of a Compound Represented by the Compound No. 3-45 in Table 3-1

11.15 g (0.105 mole) of 3-mercaptothietane was introduced to 50 g of pure water. Subsequently, 41.2 g (0.103 mole) of a 10% NaOH aqueous solution was introduced dropwise at room temperature over 40 minutes. Then, the reaction solution was subjected to a temperature elevation to 30° C. and 109.8 g (corresponding to 0.050 mole of methyl tin dichloride) of an aqueous solution of 10% methyl tin dichloride was inserted dropwise at the same temperature over 4 hours. After the dropwise addition was completed, the solution was further stirred at the same temperature for 2 hours. 100 ml of chloroform was added to the reaction mixture, and the organic layer and the water layer were separated. The organic layer was washed with 100 ml of pure water twice, and then dried over anhydrous sodium sulfate. The solvent was distilled off from the extract to obtain 17.42 g (Yield: 97%) of a compound represented by the Compound No. 3-45 in Table 3-1. $^1$H-NMR data are shown in the following (solvent: CDCl$_3$, internal standard substance: TMS): δ 0.78 (6H), δ 3.24 (4H), δ 3.44 (4H), δ 4.55 (2H).

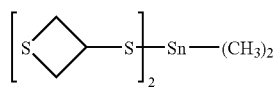

(Compound No. 3-45)

Example 7

Preparation of a Compound Represented by the Compound No. 3-75 in Table 3-2

5.42 g (0.051 mole) of 3-mercaptothietane and 4.01 g (0.026 mole) of mercaptoethyl sulfide were introduced to 50 g of pure water. Subsequently, 41.2 g (0.10 mole) of a 10% NaOH aqueous solution was introduced dropwise at room temperature over 40 minutes. Then, the reaction solution was subjected to a temperature elevation to 30° C. and 65.2 g (corresponding to 0.025 mole of tin tetrachloride) of an aqueous solution of 10% tin tetrachloride was inserted dropwise at the same temperature over 4 hours. After the dropwise addition was completed, the solution was further stirred at the same temperature for 2 hours. 100 ml of chloroform was added to the reaction mixture, and the organic layer and the water layer were separated. The organic layer was washed with 100 ml of pure water twice, and then dried over anhydrous sodium sulfate. The solvent was distilled off from the extract to obtain a coarse composition. The resulting coarse composition was purified by silica gel column chromatography with a development solvent of chloroform to obtain 8.42 g (Yield: 70%) of a compound represented by the Compound No. 3-75 in Table 3-2. $^1$H-NMR data are shown in the following (solvent: CDCl$_3$, internal standard substance: TMS): δ 2.91 (4H), δ 3.11 (4H), δ 3.28~3.56 (8H), δ 4.79 (2H).

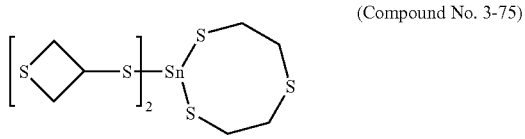
(Compound No. 3-75)

Example 8

Preparation of a Compound Represented by the Compound No. 3-2 in Table 3-1

7.71 g (Yield: 65%) of a compound represented by the Compound No. 3-2 in Table 3-1 was obtained by carrying out the same operation as in Example 1, except that 3-thiethanol was used instead of 3-mercaptothietane. $^1$H-NMR data are shown in the following (solvent: DMSO-d6, internal standard substance: TMS): δ 3.22 (16H), δ 4.96 (4H).

(Compound No. 3-2)

Example 9

Preparation of a Compound Represented by the Compound No. 3-245 in Table 3-5

11.15 g (0.105 mole) of 3-mercaptothietane was introduced to 50 g of pure water. Subsequently, 41.2 g (0.103 mole) of a 10% NaOH aqueous solution was introduced dropwise at room temperature over 40 minutes. Then, 68.2 g (corresponding to 0.050 mole of zinc chloride) of an aqueous solution of 10% zinc chloride was inserted dropwise at the same temperature over 4 hours. After the dropwise addition was completed, the reaction solution was further stirred at the same temperature for 2 hours. The resultant product was filtered off, washed with 30 ml of methanol twice, and vacuum-dried at room temperature to obtain 13.13 g (Yield: 95%) of a compound represented by the Compound No. 3-245 in Table 3-5. $^1$H-NMR data are shown in the following (solvent: DMSO-d6, internal standard substance: TMS): δ 3.22 (8H), δ 4.50 (2H).

(Compound No. 3-245)

Example 10

Preparation of a Compound Represented by the Compound No. 3-141 in Table 3-3

10.62 g (0.100 mole) of 3-mercaptothietane was introduced to 65 g of dried hexane, and 10.12 g (0.100 mole) of triethylamine dried at 20° C. to 25° C. was added thereto at the same temperature and stirred for 5 minutes. A solution of 4.25 g (0.025 mole) of silicon tetrachloride dissolved in 18 g of hexane was added dropwise at 20° C. to 25° C. to the obtained mixture over 40 minutes. After the dropwise addition was completed, the reaction solution was further stirred at the same temperature for 6 hours. The resultant product precipitated along with the by-product triethylamine hydrochloride was filtered off. The coarse composition was washed successively with 50 ml of pure water and 50 ml of methanol twice respectively, and vacuum-dried at room temperature to obtain 7.86 g (Yield: 70%) of a compound represented by the Compound No. 3-141 in Table 3-3. $^1$H-NMR data are shown in the following (solvent: CDCl$_3$, internal standard substance: TMS): δ 3.24 (8H), δ 3.55 (8H), δ 4.65 (4H).

(Compound No. 3-141)

Example 11

Preparation of a Compound Represented by the Compound No. 3-142 in Table 3-3

7.21 g (Yield: 75%) of a compound represented by the Compound No. 3-142 in Table 3-3 was obtained by carrying out the same operation as in Example 10, except that 3-thiethanol was used instead of 3-mercaptothietane. $^1$H-NMR data are shown in the following (solvent: DMSO-d6, internal standard substance: TMS): δ 3.03 (8H), δ 3.30 (8H), δ 4.89 (4H).

(Compound No. 3-142)

Example 12

Preparation of a Compound Represented by the Compound No. 3-193 in Table 3-4

8.74 g (Yield: 71%) of a compound represented by the Compound No. 3-193 in Table 3-4 was obtained by carrying out the same operation as in Example 10, except that germanium tetrachloride was used instead of silicon tetrachloride. $^1$H-NMR data are shown in the following (solvent: CDCl$_3$, internal standard substance: TMS): δ 3.26 (8H), δ 3.55 (8H), δ 4.68 (4H).

(Compound No. 3-193)

Example 13

Preparation of a Compound Represented by the Compound No. 3-179 in Table 3-4

6.37 g (0.060 mole) of 3-mercaptothietane was introduced to 50 g of dried hexane, and 6.07 g (0.060 mole) of triethylamine dried at 20° C. to 25° C. was added thereto at the same temperature and stirred for 5 minutes. A solution of 4.23 g (0.020 mole) of phenyl trichlorosilane dissolved in 18 g of hexane was added dropwise at 20° C. to 25° C. to the obtained mixture over 40 minutes. After the dropwise addition was completed, the reaction solution was further stirred at the same temperature for 6 hours. 100 g of hexane was put to the reaction mixture and the by-product triethylamine hydrochloride was precipitated. The triethylamine hydrochloride was filtered off to obtain a filtrate, and the solvent was distilled off from the obtained filtrate to obtain 2.52 g (Yield: 30%) of a compound represented by the Compound No. 3-179 in Table 3-4. $^1$H-NMR data are shown in the following (solvent: CDCl$_3$, internal standard substance: TMS): δ 3.06 (6H), δ 3.52 (6H), δ 4.54 (3H), δ 7.44 (3H), δ 7.68 (2H).

(Compound No. 3-179)

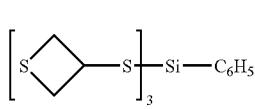

<Preparation of the Polymerizable Composition of the Present Invention and Preparation of the Resin Cured Product by the Polymerization>

The physical properties of the resins or optical components (lenses) prepared in Examples were evaluated in the following methods.

Appearance: color, transparency, and optical strain were confirmed visually or using a microscope.

Refractive index: It was measured at 20° C. using a Pulfrich refractometer.

Example 14

At room temperature (25° C.), 30 g of the compound represented by the Compound No. 3-1 in Table 3-1 prepared in Example 2 was weighed in a glass beaker, filtered off using a PTFE filter without adding a polymerization catalyst, and then thoroughly degassed under a reduced pressure of not more than 1.3 kPa until no bubble was observed. The polymerizable composition was filled into a mold composed of a glass mold and a tape. Then, the resultant was put into a heating oven, subjected to a temperature elevation up to 30° C. to 120° C. slowly, and polymerized for 20 hours.

A sample piece of the obtained resin was excellent in transparency and had good appearance with no strain. The refractive index (nd) of the obtained resin was measured. As a result, it was 1.790.

Example 15

At room temperature (25° C.), 30 g of the compound represented by the Compound No. 3-35 in Table 3-1 prepared in Example 3 was weighed in a glass beaker, and as a polymerization catalyst, 0.15 g of a mercaptopropionic acid was added thereto, and then the resulting mixture was stirred for fully mixing. The obtained mixed solution was filtered off using a PTFE filter, and then thoroughly degassed under a reduced pressure of not more than 1.3 kPa until no bubble was observed. The polymerizable composition was filled into a mold composed of a glass mold and a tape. Then, the resultant was put into a heating oven, subjected to a temperature elevation up to 80° C. to 120° C. slowly, and polymerized for 30 hours.

A sample piece of the obtained resin was excellent in transparency and had good appearance with no strain. The refractive index (nd) of the obtained resin was measured. As a result, it was 1.755.

Example 16

At room temperature (25° C.), 30 g of the compound represented by the Compound No. 3-41 in Table 3-1 prepared in Example 4 was weighed in a glass beaker, and as a polymerization catalyst, 0.15 g of a trifluoroacetic acid was added thereto, and then the resulting mixture was stirred for fully mixing. The obtained mixed solution was filtered off using a PTFE filter, and then thoroughly degassed under a reduced pressure of not more than 1.3 kPa until no bubble was observed. The polymerizable composition was filled into a mold composed of a glass mold and a tape. Then, the resultant was put into a heating oven, subjected to a temperature elevation up to 80° C. to 120° C. slowly, and polymerized for 30 hours.

A sample piece of the obtained resin was excellent in transparency and had good appearance with no strain. The refractive index (nd) of the obtained resin was measured. As a result, it was 1.720.

Example 17

At room temperature (25° C.), 30 g of the compound represented by the Compound No. 3-45 in Table 3-1 prepared in Example 6 was weighed in a glass beaker, and as a polymerization catalyst, 0.15 g of a trifluoroacetic acid and 0.15 g of a mercaptopropionic acid were added thereto, and then the resulting mixture was stirred for fully mixing. The obtained mixed solution was filtered off using a PTFE filter, and then thoroughly degassed under a reduced pressure of not more than 1.3 kPa until no bubble was observed. The polymerizable composition was filled into a mold composed of a glass mold and a tape. Then, the resultant was put into a heating oven, subjected to a temperature elevation up to 80° C. to 120° C. slowly, and polymerized for 80 hours.

A sample piece of the obtained resin was excellent in transparency and had good appearance with no strain. The refractive index (nd) of the obtained resin was measured. As a result, it was 1.711.

Example 18

At room temperature (25° C.), 24 g of the compound represented by the Compound No. 3-45 in Table 3-1 prepared in Example 6 and 6 g of the compound represented by the Compound No. 3-1 in Table 3-1 prepared in Example 2 were weighed in a glass beaker, filtered off using a PTFE filter without adding a polymerization catalyst, and then thoroughly degassed under a reduced pressure of not more than 1.3 kPa until no bubble was observed. The polymerizable composition was filled into a mold composed of a glass mold and a tape. Then, the resultant was put into a heating oven, subjected to a temperature elevation up to 80° C. to 120° C. slowly, and polymerized for 60 hours.

A sample piece of the obtained resin was excellent in transparency and had good appearance with no strain. The refractive index (nd) of the obtained resin was measured. As a result, it was 1.729.

Example 19

At room temperature (25° C.), 30 g of the compound represented by the Compound No. 3-75 in Table 3-2 prepared in Example 7 was weighed in a glass beaker, filtered off using a PTFE filter without adding a polymerization catalyst, and then thoroughly degassed under a reduced pressure of not more than 1.3 kPa until no bubble was observed. The polymerizable composition was filled into a mold composed of a glass mold and a tape. Then, the resultant was put into a heating oven, subjected to a temperature elevation up to 80° C. to 120° C. slowly, and polymerized for 20 hours.

A sample piece of the obtained resin was excellent in transparency and had good appearance with no strain. The refractive index (nd) of the obtained resin was measured. As a result, it was 1.776.

Example 20

At room temperature (25° C.), 30 g of the compound represented by the Compound No. 3-2 in Table 3-1 prepared in Example 8 was weighed in a glass beaker, and as a polymerization catalyst, 0.15 g of a trifluoromethane sulfonic acid was added thereto, and then the resulting mixture was stirred for fully mixing. The obtained mixed solution was filtered off using a PTFE filter, and then thoroughly degassed under a reduced pressure of not more than 1.3 kPa until no bubble was observed. The polymerizable composition was filled into a mold composed of a glass mold and a tape. Then, the resultant was put into a heating oven, subjected to a temperature elevation up to 30° C. to 120° C. slowly, and polymerized for 20 hours.

A sample piece of the obtained resin was excellent in transparency and had good appearance with no strain. The refractive index (nd) of the obtained resin was measured. As a result, it was 1.760.

Example 21

At 30° C., 30 g of the compound represented by the Compound No. 3-141 in Table 3-3 prepared in Example 10 was weighed in a glass beaker, and as a polymerization catalyst, 0.15 g of a trifluoromethane sulfonic acid was added thereto, and then the resulting mixture was stirred for fully mixing. The obtained mixed solution was filtered off using a PTFE filter, and then thoroughly degassed under a reduced pressure of not more than 1.3 kPa until no bubble was observed. The polymerizable composition was filled into a mold composed of a glass mold and a tape. Then, the resultant was put into a heating oven, subjected to a temperature elevation up to 30° C. to 120° C. slowly, and polymerized for 20 hours. A sample piece of the obtained resin was excellent in transparency and had good appearance with no strain. The refractive index (nd) of the obtained resin was measured. As a result, it was 1.754.

Example 22

At 40° C., 30 g of the compound represented by the Compound No. 3-193 in Table 3-4 prepared in Example 12 was weighed in a glass beaker, and as a polymerization catalyst, 0.30 g of a trifluoroacetic acid was added thereto, and then the resulting mixture was stirred for fully mixing. The obtained mixed solution was filtered off using a PTFE filter, and then thoroughly degassed under a reduced pressure of not more than 1.3 kPa until no bubble was observed. The polymerizable composition was filled into a mold composed of a glass mold and a tape. Then, the resultant was put into a heating oven, subjected to a temperature elevation up to 80° C. to 120° C. slowly, and polymerized for 70 hours.

A sample piece of the obtained resin was excellent in transparency and had good appearance with no strain. The refractive index (nd) of the obtained resin was measured. As a result, it was 1.752.

Example 23

At room temperature (25° C.), 24 g of the compound represented by the Compound No. 3-193 in Table 3-4 prepared in Example 12 and 6 g of the compound represented by the Compound No. 3-1 in Table 3-1 prepared in Example 2 were weighed in a glass beaker, and as a polymerization catalyst, 0.30 g of a mercaptopropionic acid was added thereto, and then the resulting mixture was stirred for fully mixing. The obtained mixed solution was filtered off using a PTFE filter, and then thoroughly degassed under a reduced pressure of not more than 1.3 kPa until no bubble was observed. The polymerizable composition was filled into a mold composed of a glass mold and a tape. Then, the resultant was put into a heating oven, subjected to a temperature elevation up to 80° C. to 120° C. slowly, and polymerized for 70 hours.

A sample piece of the obtained resin was excellent in transparency and had good appearance with no strain. The refractive index (nd) of the obtained resin was measured. As a result, it was 1.762.

The resin obtained by polymerization of the polymerizable compound of the present invention has high transparency, good heat resistance and mechanical strength, while attaining a high refractive index (nd) exceeding 1.7. Therefore, the resin of the present invention is useful as a resin for use in optical components such as plastic lenses and the like.

The invention claimed is:

1. A compound represented by the general formula (3),

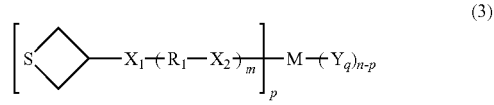

wherein, in the formula, M represents a metal atom; $X_1$ and $X_2$ each independently represent a sulfur atom or an oxygen atom; $R_1$ represents a divalent organic group; m represents an integer of or 1 or more; p represents an integer of from 2 to n; n represents a valence of a metal atom M; Yq each independently represent an inorganic or organic residue; and when (n−p) is 2 or more, Yq may be bonded to one another for forming a ring structure with the intermediary of a metal atom M.

2. The compound according to claim 1, wherein the metal atom is a Sn atom, a Si atom, a Zr atom, a Ge atom, a Ti atom, a Zn atom, an Al atom, a Fe atom, a Cu atom, a Pt atom, a Pb atom, an Au atom or an Ag atom.

3. The compound according to claim 1, wherein the metal atom is a Sn atom, a Si atom, a Zr atom, a Ti atom, a Ge atom, an Al atom, a Pb atom or a Zn atom.

4. A polymerizable composition comprising at least one compound as described in claim 1.

5. A polymerizable composition comprising at least one compound as described in claim 2.

6. A polymerizable composition comprising at least one compound as described in claim 3.

* * * * *